US012354529B2

(12) United States Patent
Jung et al.

(10) Patent No.: US 12,354,529 B2
(45) Date of Patent: *Jul. 8, 2025

(54) PIXEL DRIVING CIRCUIT AND DISPLAY DEVICE

(71) Applicant: SAPIEN SEMICONDUCTORS INC., Seongnam-si (KR)

(72) Inventors: Jun Young Jung, Seongnam-si (KR); Myunghee Lee, Seongnam-si (KR)

(73) Assignee: SAPIEN SEMICONDUCTORS INC., Seongnam-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/415,191

(22) Filed: Jan. 17, 2024

(65) Prior Publication Data

US 2024/0153444 A1 May 9, 2024

Related U.S. Application Data

(63) Continuation-in-part of application No. 18/113,852, filed on Feb. 24, 2023, now Pat. No. 12,062,328,
(Continued)

(30) Foreign Application Priority Data

Jun. 28, 2018 (KR) ........................ 10-2018-0074941

(51) Int. Cl.
*G09G 3/32* (2016.01)

(52) U.S. Cl.
CPC ........... *G09G 3/32* (2013.01); *G09G 2300/08* (2013.01); *G09G 2310/0289* (2013.01); *G09G 2310/08* (2013.01); *G09G 2330/021* (2013.01)

(58) Field of Classification Search
CPC ....... G09G 2310/0289; G09G 2300/08; G09G 3/32; G09G 2330/021; G09G 2310/08
See application file for complete search history.

(56) References Cited

U.S. PATENT DOCUMENTS

| | | | | |
|---|---|---|---|---|
| 9,990,883 | B2 | 6/2018 | Park et al. | |
| 11,922,860 | B2 * | 3/2024 | Hwang | G09G 3/32 |

(Continued)

FOREIGN PATENT DOCUMENTS

| | | | |
|---|---|---|---|
| CN | 1534573 | A | 10/2004 |
| CN | 1602536 | A | 3/2005 |

(Continued)

OTHER PUBLICATIONS

Final Office Action issued in parent U.S. Appl. No. 17/047,544 mailed Jul. 16, 2021.

(Continued)

*Primary Examiner* — Muhammad N Edun
(74) *Attorney, Agent, or Firm* — Rankin, Hill & Clark LLP

(57) ABSTRACT

The present embodiments disclose a pixel. A pixel according to an embodiment of the present disclosure comprises a luminous element and a pixel circuit connected to the luminous element, wherein the pixel circuit include a first pixel circuit configured to control light-emission and non-emission of the luminous element in response to a control signal applied to each of a plurality of subframes constituting a single frame during a light-emitting period, a second pixel circuit configured to store bit values of image data in a data writing period and generate the control signal based on the bit values and a clock signal, a bias circuit configured to supply a driving power to the first pixel circuit, and a bias controller configured to generate a bias control signal for controlling the bias circuit and output the bias control signal to the bias circuit.

3 Claims, 16 Drawing Sheets

Related U.S. Application Data which is a continuation-in-part of application No. 17/942,219, filed on Sep. 12, 2022, now Pat. No. 11,735,106, which is a continuation of application No. 17/890,737, filed on Aug. 18, 2022, now Pat. No. 11,862,071, which is a continuation-in-part of application No. 17/547,393, filed on Dec. 10, 2021, now Pat. No. 11,482,165, which is a continuation of application No. 17/047,544, filed as application No. PCT/KR2018/009078 on Aug. 9, 2018, now Pat. No. 11,238,783.

(56) References Cited

U.S. PATENT DOCUMENTS

| | | | | |
|---|---|---|---|---|
| 2004/0104686 | A1 | 6/2004 | Shin et al. | |
| 2007/0279359 | A1 | 12/2007 | Yoshida et al. | |
| 2009/0218958 | A1 | 9/2009 | Shimizu | |
| 2013/0038591 | A1 | 2/2013 | Yang | |
| 2016/0267837 | A1* | 9/2016 | Wang | G09G 3/3216 |
| 2018/0182279 | A1 | 6/2018 | Sakariya et al. | |
| 2019/0347979 | A1 | 11/2019 | Ahmed | |
| 2020/0098307 | A1* | 3/2020 | Li | G09G 3/32 |
| 2020/0329536 | A1* | 10/2020 | Chilukuri | H05B 47/21 |
| 2022/0358883 | A1* | 11/2022 | Li | G09G 3/3266 |

FOREIGN PATENT DOCUMENTS

| | | | |
|---|---|---|---|
| CN | 106205475 | A | 12/2016 |
| CN | 111243505 | A | 6/2020 |
| JP | 2010-276783 | A | 12/2010 |
| KR | 10-2002-0073507 | A | 9/2002 |
| KR | 10-0432554 | | 5/2004 |
| KR | 10-2004-0093504 | A | 11/2004 |
| KR | 10-2004-0111032 | A | 12/2004 |
| KR | 10-2007-0116440 | A | 12/2007 |
| KR | 10-2147402 | B1 | 8/2020 |
| WO | 01/73738 | A1 | 10/2001 |

OTHER PUBLICATIONS

International Search Report for PCT/KR2018/009078 dated Feb. 22, 2019 (PCT/ISA/210).

Non-Final Office Action issued in parent U.S. Appl. No. 17/547,393 on Jul. 13, 2022.

Notice of Allowance issued in parent U.S. Appl. No. 17/047,544 mailed Sep. 24, 2021.

Office Action issued in parent U.S. Appl. No. 17/047,544 mailed Mar. 31, 2021.

Office Action issued in parent U.S. Appl. No. 17/942,219 mailed Jan. 13, 2023.

Chinese Office Action issued on Jul. 12, 2024, Application No. 2022111692640; 3 pages.

* cited by examiner

PIXEL DRIVING CIRCUIT AND DISPLAY DEVICE

CROSS REFERENCE TO RELATED APPLICATIONS

This application is a continuation-in-part of U.S. patent application Ser. No. 18/113,852, filed on Feb. 24, 2023, which is a continuation-in-part of U.S. patent application Ser. No. 17/942,219, filed on Sep. 12, 2022, which is continuation of U.S. application Ser. No. 17/890,737, filed Aug. 18, 2022, claiming priority based on Korean Patent Application No. 10-2018-0074941 filed Jun. 28, 2018.

TECHNICAL FIELD

The present embodiments relate to a pixel driving circuit and a display device including the same.

RELATED ART

Display devices using light-emitting diodes (LED) are gaining popularity in a wide range of fields, from small handheld electronic devices to large outdoor display devices. LED display devices enable accurate voltage switching of each pixel by allowing each pixel to include a pixel circuit for driving a LED.

DETAILED DESCRIPTION OF THE DISCLOSURE

Technical Problem

An embodiment of the present disclosure is to provide a display device capable of reducing power consumption.

Technical Solution

A pixel according to an embodiment of the present disclosure comprises a luminous element and a pixel circuit connected to the luminous element, wherein the pixel circuit include a first pixel circuit configured to control light-emission and non-emission of the luminous element in response to a control signal applied to each of a plurality of subframes constituting a single frame during a light-emitting period, a second pixel circuit configured to store bit values of image data in a data writing period and generate the control signal based on the bit values and a clock signal, a bias circuit configured to supply a driving power to the first pixel circuit, and a bias controller configured to generate a bias control signal for controlling the bias circuit and output the bias control signal to the bias circuit.

Advantageous Effects of the Disclosure

A display device according to an embodiment of the present disclosure can reduce power consumption.

BEST MODE FOR DISCLOSURE

Figure 1:
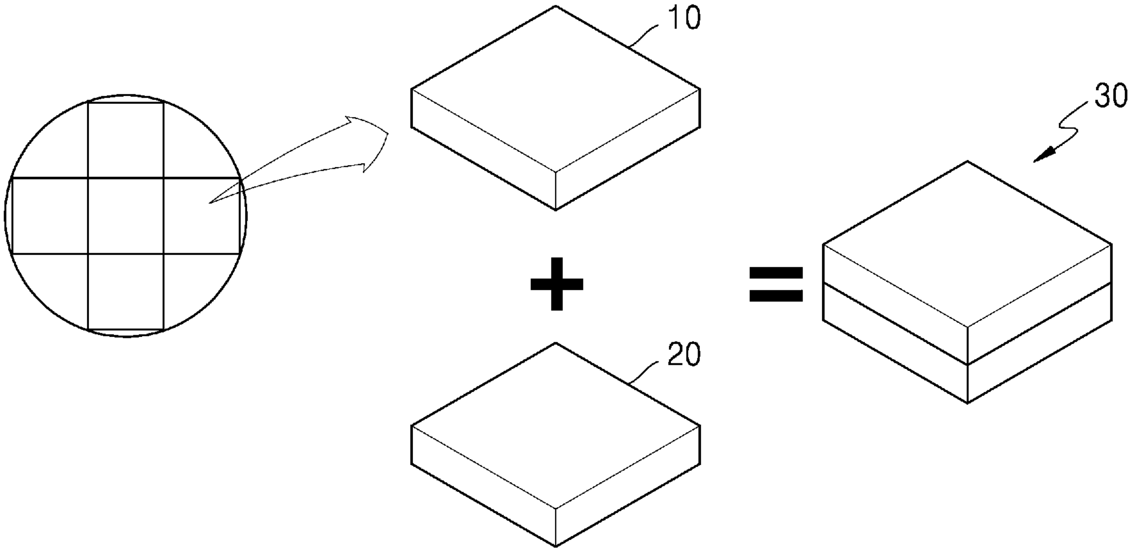
FIG. 1 is a diagram schematically illustrating a manufacturing process of a display device according to an embodiment of the present disclosure.

The present embodiments disclose a pixel. A pixel according to an embodiment of the present disclosure comprises a luminous element and a pixel circuit connected to the luminous element, wherein the pixel circuit include a first pixel circuit configured to control light-emission and non-emission of the luminous element in response to a control signal applied to each of a plurality of subframes constituting a single frame during a light-emitting period, a second pixel circuit configured to store bit values of image data in a data writing period and generate the control signal based on the bit values and a clock signal, a bias circuit configured to supply a driving power to the first pixel circuit, and a bias controller configured to generate a bias control signal for controlling the bias circuit and output the bias control signal to the bias circuit.

Mode for Disclosure

Since the present disclosure may apply various transformations and have various embodiments, specific embodiments will be illustrated in a diagram and described in detail in the detailed description. The effects and features of the present disclosure, and a method of achieving them, will be clarified with reference to the embodiments described later in detail together with diagrams. However, the present disclosure is not limited to the embodiments disclosed below and may be implemented in various forms.

Hereinafter, embodiments of the present disclosure will be described in detail with reference to attached diagrams, and when describing with reference to diagrams, the same or corresponding constituent elements are assigned the same diagram symbol, and redundant descriptions thereof will be omitted.

In the following embodiments, terms such as first and second are used for distinguishing one constituent element from other constituent elements. These constituent elements should not be limited by these terms. In addition, in the following embodiments, expressions in the singular include plural expressions unless the context clearly indicates otherwise.

In the following embodiments, the connection between X and Y may include a case where X and Y are electrically connected, a case where X and Y are functionally connected, and a case where X and Y are directly connected. Here, X and Y may be objects (for example, devices, elements, circuits, wirings, electrodes, terminals, conductive films, layers, etc.). Therefore, it is not limited to a certain connection relationship, for example, a connection relationship indicated in a diagram or the detailed description, and may include other connection relationships than that indicated in a diagram or the detailed description.

The case where X and Y are electrically connected may include, for example, a case where at least one element that enables the electrical connection of X and Y (e.g., a switch, a transistor, a capacitor, an inductor, a resistance element, a diode, etc.) is connected between X and Y.

The case where X and Y are functionally connected may include a case where at least one circuit of a circuit that enables a functional connection of X and Y, like in a case where the signal output from X is transmitted to Y (e.g., a logic circuit (OR gate, inverter, etc.), a signal conversion circuit (an AD conversion circuit, a gamma correction circuit, etc.), a potential level conversion circuit (a level shifter circuit, etc.), a current supply circuit, an amplification circuit (a circuit that may increase signal amplitude or current amount, etc.), a signal generation circuit, and a memory circuit (a memory, etc.), is connected between X and Y.

In the following embodiments, "ON" used in connection with the element state may refer to an activated state of the element, and "OFF" may refer to an inactive state of the element. "On" used in connection with a signal received by the element may refer to a signal that activates the element, and "off" may refer to a signal that disables the element. The element may be activated by a high voltage or a low voltage. For example, the P-type transistor is activated by a low voltage, and the N-type transistor is activated by a high voltage. Therefore, it should be understood that the "on" voltage for the P-type transistor and the N-type transistor is the opposite (low vs. high) voltage level.

In the following embodiments, terms such as include or have means that the features or elements described in the specification are present, and do not preclude the possibility that one or more other features or elements may be added.

FIG. 1 is a diagram schematically illustrating a manufacturing process of a display device according to an embodiment of the present disclosure.

Referring to FIG. 1, the display device 30 according to an embodiment may include a luminous element array 10 and a driving circuit board 20. The luminous element array 10 may be coupled with the driving circuit board 20.

The luminous element array 10 may include a plurality of luminous elements. A luminous element may be a light-emitting diode (LED). At least one luminous element array 10 may be manufactured by growing a plurality of LEDs on a semiconductor wafer (SW). Accordingly, the display device 30 may be manufactured by coupling the luminous element array 10 with the driving circuit board 20, without the need to individually transfer the LED to the driving circuit board 20.

A pixel circuit corresponding to each LED on the luminous element array may be arranged on the driving circuit board 20. The LED on the luminous element array 10 and the pixel circuit on the driving circuit board 20 may be electrically connected to form a pixel PX.

Figure 2:
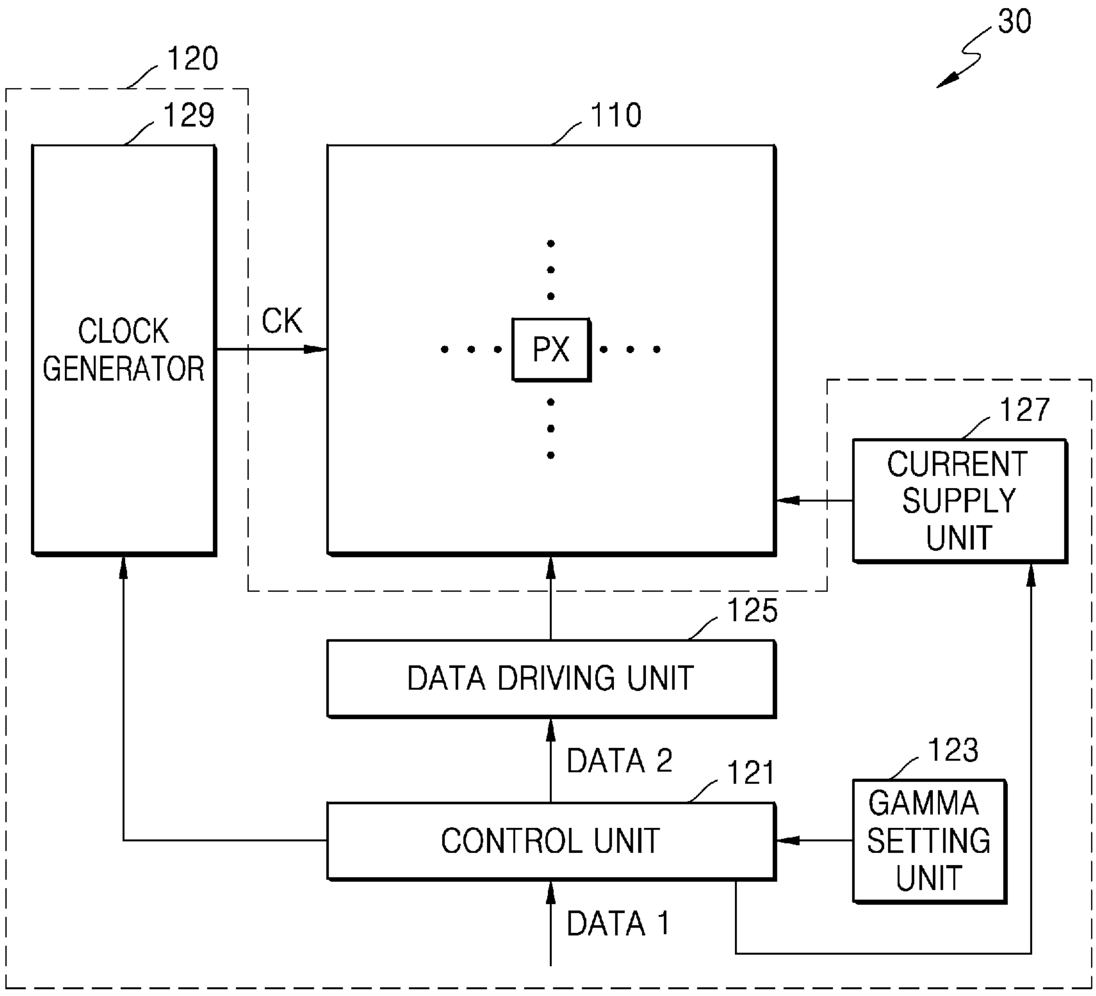
FIGS. 2 and 3 are diagrams schematically illustrating a display device according to an embodiment of the present disclosure.
Figure 3:
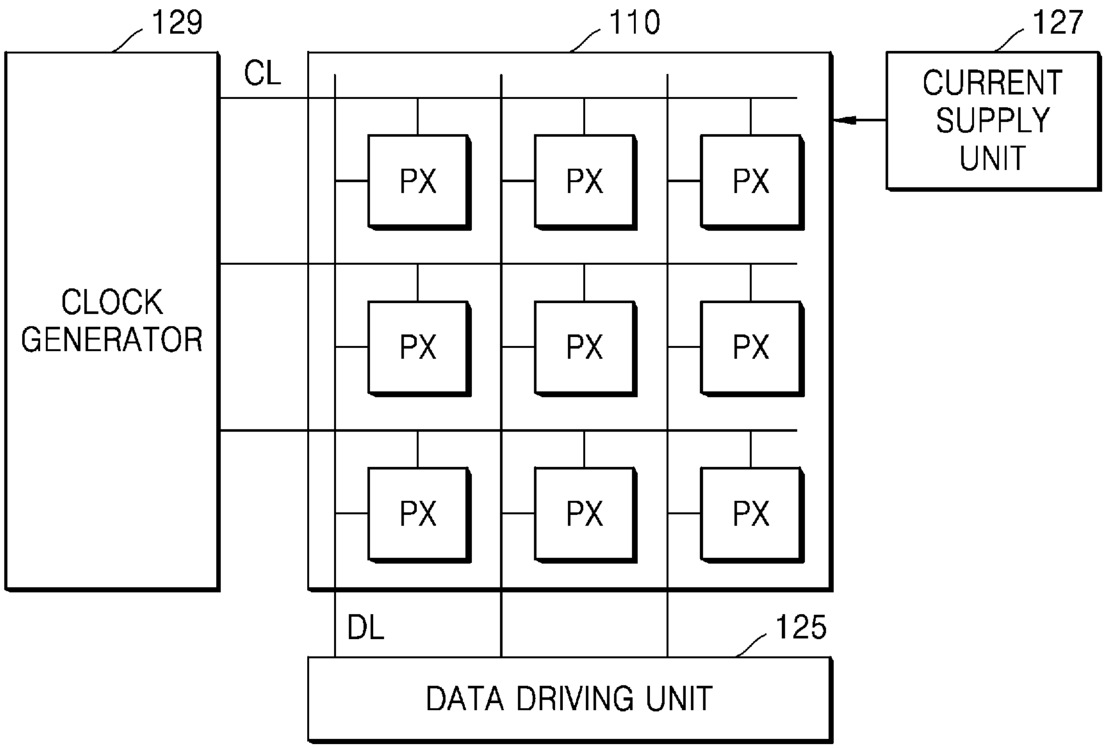

FIGS. 2 and 3 are diagrams schematically illustrating a display device 30 according to an embodiment of the present disclosure.

Referring to FIGS. 2 and 3, the display device 30 may include a pixel unit 110 and a driving unit 120.

The pixel unit 110 may display an image by using an n bit digital image signal capable of displaying 1 to 2 n gray scales. The pixel unit 110 may include a plurality of pixels PX arranged in a certain pattern, for example, a matrix-type pattern or a zigzag-type pattern. The pixel PX emits light of a single color, and may emit, for example, light of red, blue, green, or white. The pixel PX may emit light of other colors than red, blue, green, and white.

The pixel PX may include a luminous element. The luminous element may be a self-luminous element. For example, the luminous element may be a LED. The luminous element may be a LED having a micro to nano size. The luminous element may emit light having a single peak wavelength or may emit light having a plurality of peak wavelengths.

The pixel PX may further include a pixel circuit connected to the luminous element. The pixel circuit may include at least one thin-film transistor and at least one capacitor. The pixel circuit may be implemented by a semiconductor stack structure on a substrate.

A driving unit 120 may drive and control the pixel unit 110. The driving unit 120 may include a control unit 121, a gamma setting unit 123, a data driving unit 125, a current supply unit 127, and a clock generator 129.

The control unit 121 may receive image data of a frame from an external device (for example, a graphic controller) and extract gradations for each pixel PX, and convert the extracted gradations into digital data having a preset number of bits. The control unit 121 receives a correction value from the gamma setting unit 123 and performs gamma correction of input image data DATA1 using the correction value, thereby generating correction image data DATA2. The control unit 121 may output the correction image data DATA2 to the data driving unit 125. The control unit 121 may output, to a shift register 125, a most significant bit MSB to a least significant bit LSB of the correction image data DATA2 in a certain order.

The gamma setting unit 123 may set a gamma value using a gamma curve, set a correction value of image data according to a set gamma value, and output a set correction value to the control unit 121. The gamma setting unit 123 may be provided as a circuit separate from the control unit 121, or may be provided to be included in the control unit 121.

The data driving unit 125 may transfer, to each pixel PX of the pixel unit 110, the correction image data DATA2 from the control unit 121. The data driving unit 125 may provide a bit value included in the correction image data DATA2 to each pixel PX for every frame. The bit value may have one of a first logic level and a second logic level. The first logic level may be a high level and the second logic level may be a low level. Alternatively, the first logic level may be a low level and the second logic level may be a high level.

One frame may include a plurality of subframes. When display device 30 displays n bit image data, the frame may include 8 subframes. The lengths of subframes may be different from one another. For example, the length of a subframe corresponding to the most significant bit MSB of correction image data DATA2 may set to be the longest, and the length of a subframe corresponding to the least significant bit LSB may set to be the shortest. The order of the most significant bit MSB to the least significant bit LSB of the image data DATA2 may correspond to the order of a first subframe to an n-th subframe, respectively. The order of expression of subframes may be set differently depending on the designer.

The data driving unit 125 may include a line buffer and a shift register circuit. The line buffer may be one line buffer or two line buffers. The data driving unit 125 may provide n bit image data to each pixel in a line unit (a row unit).

The current supply unit 127 may generate and supply the driving current of each pixel PX. The configuration of the current supply unit 127 will be described later with reference to FIG. 4. The current supply unit 127 may be included in the pixel PX, specifically in the pixel circuit.

The clock generator 129 may generate a clock signal for every subframe during a single frame and output the generated clock signal to pixels PX. The length of the clock signal may be the same as the length of the corresponding subframe. The clock generator 129 may sequentially supply a clock signal to the clock line CL for every subframe. The clock generator 129 may generate a clock signal according to a preset subframe order. For example, when the order of expression of four subframes is 1-2-3-4, the clock generator 129 may sequentially output a first clock signal to a fourth clock signal in the order of the first subframe to a fourth subframe. When the output order of four subframes is 1-3-2-4, the clock generator 129 may output the clock signal in the order of the first clock signal, a third clock signal, a second clock signal, and the fourth clock signal in the order of the first subframe, the third subframe, the second subframe, and the fourth subframe.

Each component of the driving unit 120 may be formed as a separate integrated circuit chip or a single integrated circuit chip, and be mounted directly on a substrate on which the pixel unit 110 is formed, or be mounted on a flexible printed circuit film, or be attached in a form of a TCP (tape carrier package) on a substrate, or be formed directly on the substrate. In one embodiment, the control unit 121, the gamma setting unit 123, and the data driving unit 125 may be connected to the pixel unit 110 in the form of an integrated circuit chip, and the current supply unit 127 and the clock generator 129 may be formed directly on the substrate.

In one embodiment, the pixel unit 110 may include array of pixels and the array may form rows and columns. In the embodiment, a row controller may be connected to each of the rows and provide a clock signal to pixels in at least one of the rows in common. In the embodiment, a column controller connected to each of the columns and providing an image data signal to pixels in at least one of the columns in common.

In the embodiment, the control unit 121 may receive image data of a frame from an external device, generate a correction image data based on the received image data, and output the correction image data to the column controller. In the embodiment, the control unit 121 may output a most significant bit MSB to a least significant bit of the correction image data in a preset order to the column controller.

In one embodiment, the display device 30 may further include a parallel-to-serial converter.

The parallel to serial converter is configured to convert n clock signals generated by the clock generator 129 in parallel for each bit (e.g., MSB, LSB) into a serial clock signal. The parallel to serial converter may transfer the serial clock signal to the pixel unit 110.

The parallel to serial converter may be included in the same component as the second pixel circuit 50 of the pixel PX or may be included as a separate component among the driving circuits of the pixel PX. Also, the parallel to serial converter may be included in the clock generator 129.

Figure 4:
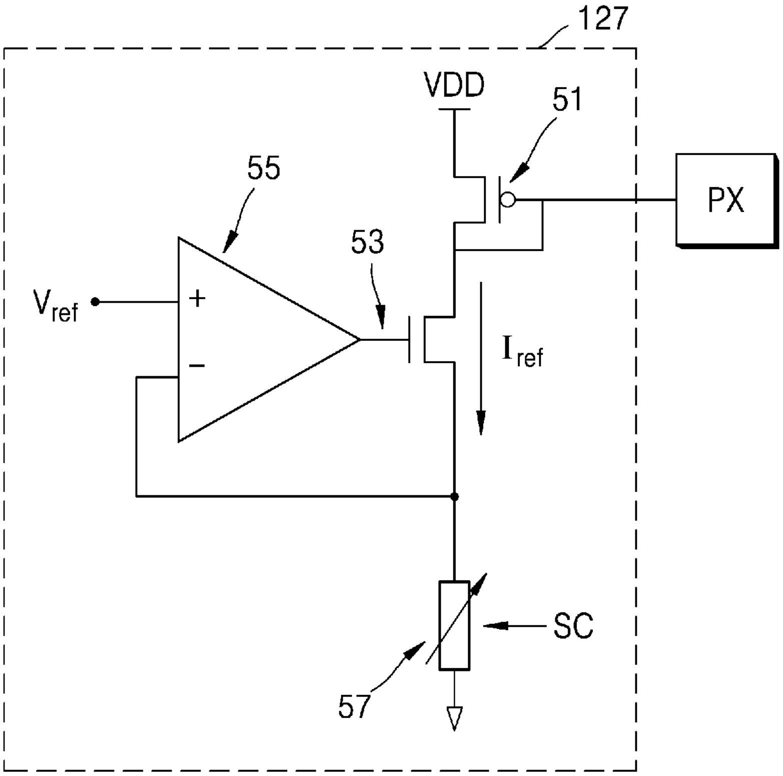
FIG. 4 is a circuit diagram illustrating a current supply unit according to an embodiment of the present disclosure.

FIG. 4 is a circuit diagram illustrating a current supply unit according to an embodiment of the present disclosure.

Referring to FIG. 4, the current supply unit 127 may include a first transistor 51, a second transistor 53, an operational amplifier 55, and a variable resistor 57.

The first transistor 51 has a gate connected to the pixel PX, a first terminal connected to a power voltage VDD, and a second terminal connected to the gate and a first terminal of the second transistor 53.

The second transistor 53 has a gate connected to an output terminal of the operational amplifier 55, the first terminal connected to the second terminal of the first transistor 51, and a second terminal connected to a second input terminal (−) of the operational amplifier 55.

A first input terminal (+) of the operational amplifier 55 is connected to a reference voltage $V_{ref}$, and the second input terminal (−) is connected to the variable resistor 57. The output terminal of the operational amplifier 55 is connected to the gate of the second transistor 53. When the reference voltage $V_{ref}$ is applied to the first input terminal (+), the second transistor 53 may be turned on or off according to the voltage at the output terminal due to the voltage difference among the first input terminal (+), the second input terminal (−) and the output terminal.

A resistance value of the variable resistor 57 may be determined according to the control signal SC from the control unit 121. Depending on the resistance value of the variable resistor 57, a voltage of the output terminal of the operational amplifier 55 VDD may be changed, and the current $I_{ref}$ flowing along the first transistor 51 and second transistor 53 turned on from the power voltage VDD may be determined.

The current supply unit 127 may supply a driving current corresponding to the current $I_{ref}$ to the pixel PX by configuring a current mirror together with a transistor in the pixel PX. The driving current may determine a total luminance (brightness) of the pixel unit 110.

In the above-described embodiment, the current supply unit 127 includes the first transistor 51 implemented as a P-type transistor and the second transistor 53 implemented as an N-type transistor, but the embodiment of the present disclosure is not limited thereto. In one or more embodiments, the first transistor 51 and second transistor 53 may be implemented as different types of transistors, and an operational amplifier corresponding thereto may be configured to form the current supply unit 127.

Figure 5:
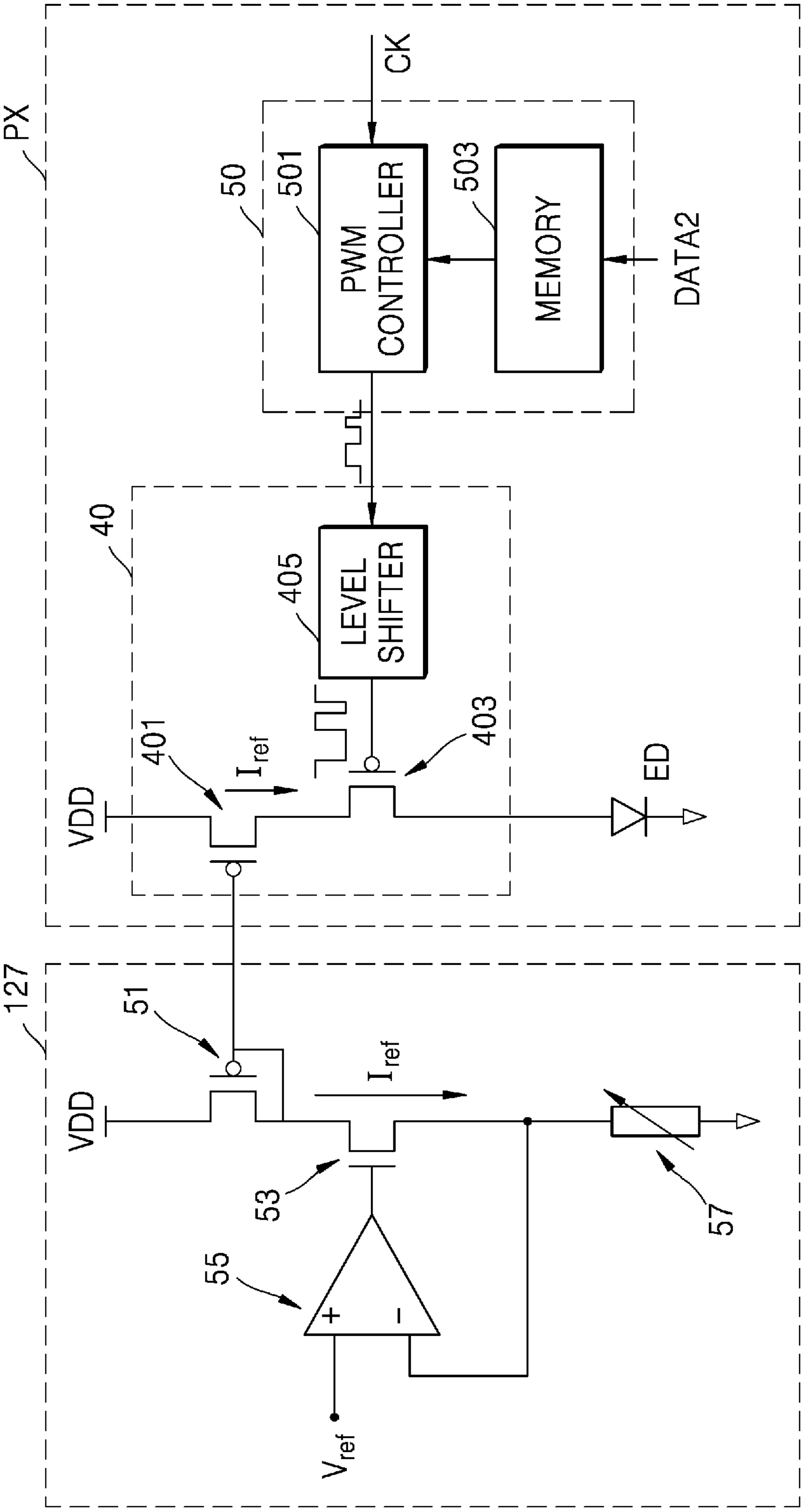
FIG. 5 is a circuit diagram illustrating a pixel PX according to an embodiment of the present disclosure.

FIG. 5 is a circuit diagram illustrating a pixel PX according to an embodiment of the present disclosure.

Referring to FIG. 5, the pixel PX may include a luminous element ED and a pixel circuit including a first pixel circuit 40 and a second pixel circuit 50 connected thereto. The first pixel circuit 40 may be a high voltage driving circuit, and the second pixel circuit 50 may be a low voltage driving circuit. The second pixel circuit 50 may be implemented as a plurality of logic circuits.

The luminous element ED may selectively emit light for every subframe based on a bit value (logic level) of image data provided from the data driving unit 125 during a single frame, thereby adjusting the light-emission time within the single frame to display gradation.

The first pixel circuit 40 may control light-emission and non-emission of the luminous element ED in response to the control signal applied to each of the plurality of subframes during a single frame. The control signal may be a pulse width modulation (PWM) signal. The first pixel circuit 40 may include a first transistor 401, a second transistor 403, and a level shifter 405 electrically connected to the current supply unit 127.

The first transistor 401 may output the driving current. The first transistor 401 includes a gate connected to the current supply unit 127, a first terminal connected to the power voltage VDD, and a second terminal connected to a first terminal of the second transistor 403. The gate of the first transistor 401 is connected to the gate of the first transistor 51 of the current supply unit 127, thereby forming a current mirror circuit with the current supply unit 127. Accordingly, as the first transistor 51 of the current supply unit 127 is turned on, the first transistor 401 which has been turn on may supply a driving current corresponding to the current $I_{ref}$ formed in the current supply unit 127. The driving current may be equal to the current $I_{ref}$ flowing in the current supply unit 127.

The second transistor 403 may transmit or block the driving current to the luminous element ED according to the PWM signal. The second transistor 403 includes a gate connected to an output terminal of the level shifter 405, the first terminal connected to the second terminal of the first transistor 401, and a second terminal connected to the luminous element ED.

The second transistor 403 may be turned on or off according to the voltage output from the level shifter 405. The light-emission time of the luminous element ED may be adjusted according to the turn-on or turn-off time of the second transistor 403. The second transistor 403 may be turned on when a gate-on-level signal (low level in the embodiment of FIG. 5) is applied to the gate, and transfers the driving current Let output from the first transistor 401 to the luminous element ED, so that the luminous element ED may emit light. The second transistor 403 may be turned off when a gate-off level signal (high level in the embodiment of FIG. 5) is applied to the gate, and blocks the driving current Let output from the first transistor 401 from being transferred to the luminous element ED, so that the luminous element ED may not emit light. During a single frame, the light-emission time and the non-emission time of the luminous element ED are controlled by the turn-on time and the turn-off time of the second transistor 403, so that a color depth of the pixel unit 110 may be expressed.

The level shifter 405 may be connected to an output terminal of a PWM controller 501 of the second pixel circuit 50, and may convert a voltage level of a first PWM signal output from the PWM controller 501 to generate a second PWM signal. The level shifter 405 may generate a second PWM signal by converting a first PWM signal into a gate-on voltage level signal capable of turning on the second transistor 403 and a gate-off level signal capable of turning off the second transistor 403.

A pulse voltage level of the second PWM signal output by the level shifter 405 may be higher than a pulse voltage level of the first PWM signal, and the level shifter 405 may include a booster circuit that boosts an input voltage. The level shifter 405 may be implemented as a plurality of transistors.

The turn-on time and turn-off time of the second transistor 403 during a single frame may be determined according to a pulse width of the first PWM signal.

The second pixel circuit 50 may store a bit value of image data applied from the data driving unit 125 during a data writing period for every frame, and generate the first PWM signal based on the bit value and a clock signal during the light-emitting period. The second pixel circuit 50 may include the PWM controller 501 and a memory 503.

The PWM controller 501 may generate the first PWM signal based on a clock signal CK input from the clock generator 120 and a bit value of image data read from the memory 503 during the light-emission period. When a clock signal in a subframe is input from a clock generator 120, the PWM controller 501 may read a corresponding image data bit value from the memory 503 to generate a first PWM signal.

The PWM controller 501 may control a pulse width of a first PWM signal based on a bit value of image data in a subframe and a signal width of a clock signal. For example, when the bit value of the image data is 1, the pulse output of the PWM signal may be turned on as much as the signal width of the clock signal, and when the bit value of the image data is 0, the pulse output of the PWM signal may be turned off as much as the signal width of the clock signal. That is, an on time of the pulse output of the PWM signal and an off time of the pulse output may be determined by the signal width (signal length) of the clock signal. The PWM controller 501 may include at least one logic circuit (for example, an OR gate circuit, etc.) implemented as at least one transistor.

In synchronization with a frame start signal, the memory 503 may receive and store in advance the n bit correction image data DATA2 applied through a data line DL from the data driving unit 125 during the data writing period. In the case of a still image, image data previously stored in the memory 503 before an image update or refresh may be used for continuous image display for a plurality of frames.

The bit values (logic levels) from the most significant bit MSB to the least significant bit LSB of the n bit correction image data DATA2 may be input from the data driving unit 125 to the memory 503 in a certain order. The memory 503 may store at least 1 bit data. In one embodiment, the memory 503 may be an n bit memory. In the memory 503, the bit values from the most significant bit MSB to the least significant bit LSB of correction image data DATA2 may be recorded during the data writing period of the frame. In another embodiment, the memory 503 may be implemented as a bit memory of less than n depending on a driving frequency. The memory 503 may be implemented as at least one transistor. The memory 503 may be implemented as a random access memory (RAM), for example, SRAM or DRAM.

Figure 6:
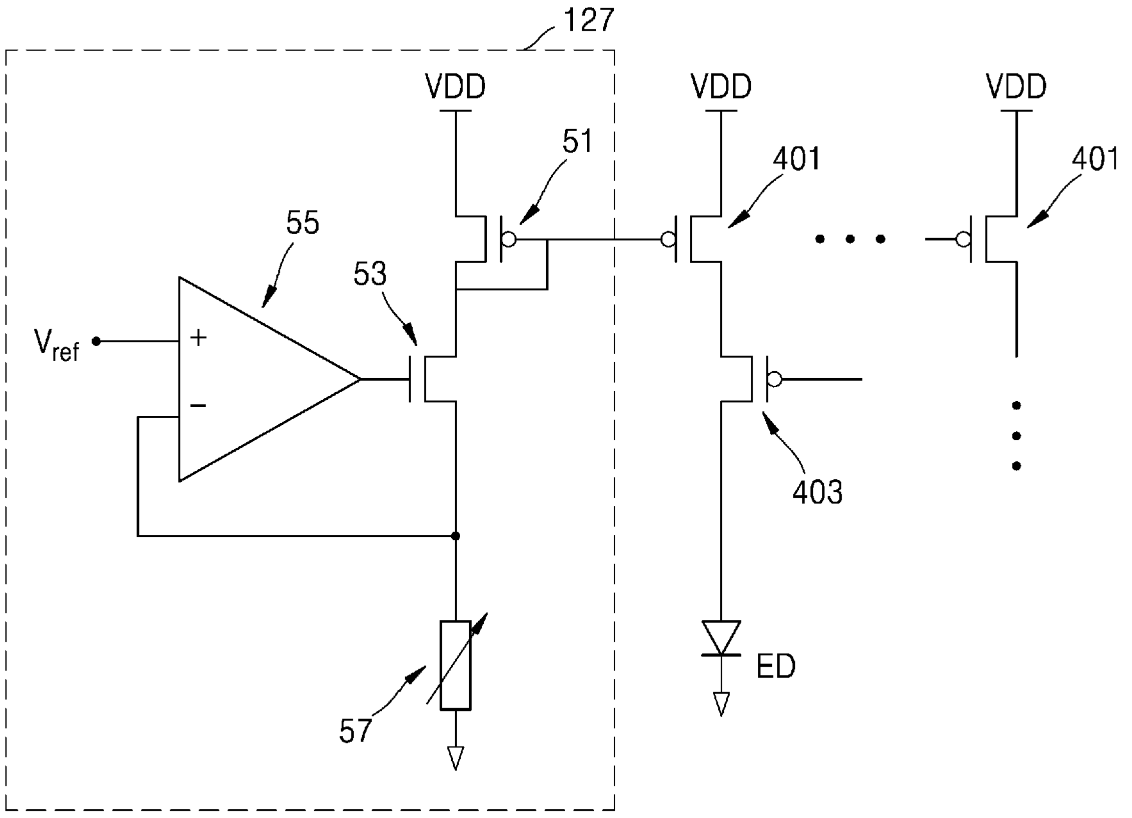
FIG. 6 is a diagram illustrating a connection relationship between a current supply unit and a pixel according to an embodiment of the present disclosure.

In the embodiment of FIG. 5, the current supply unit 127 is connected to one pixel PX, but the current supply unit 127 may be shared by a plurality of pixels PX. For example, as illustrated in FIG. 6, the first transistor 51 of the current supply unit 127 may be electrically connected to the first transistor 401 of each pixel PX of the pixel unit 110 to form a current mirror circuit. In another embodiment, the current supply unit 127 may be provided for every row, and the current supply unit 127 of each row may be shared by a plurality of pixels PXs in the same row.

In the above-described embodiment, the pixel includes P-type transistors, but the present disclosure embodiment is not limited thereto. In one or embodiments, the pixel may include N-type transistors, and in this case, the pixel may be driven by a signal in which the level of the signal applied to the P-type transistors is inverted.

Figure 7:
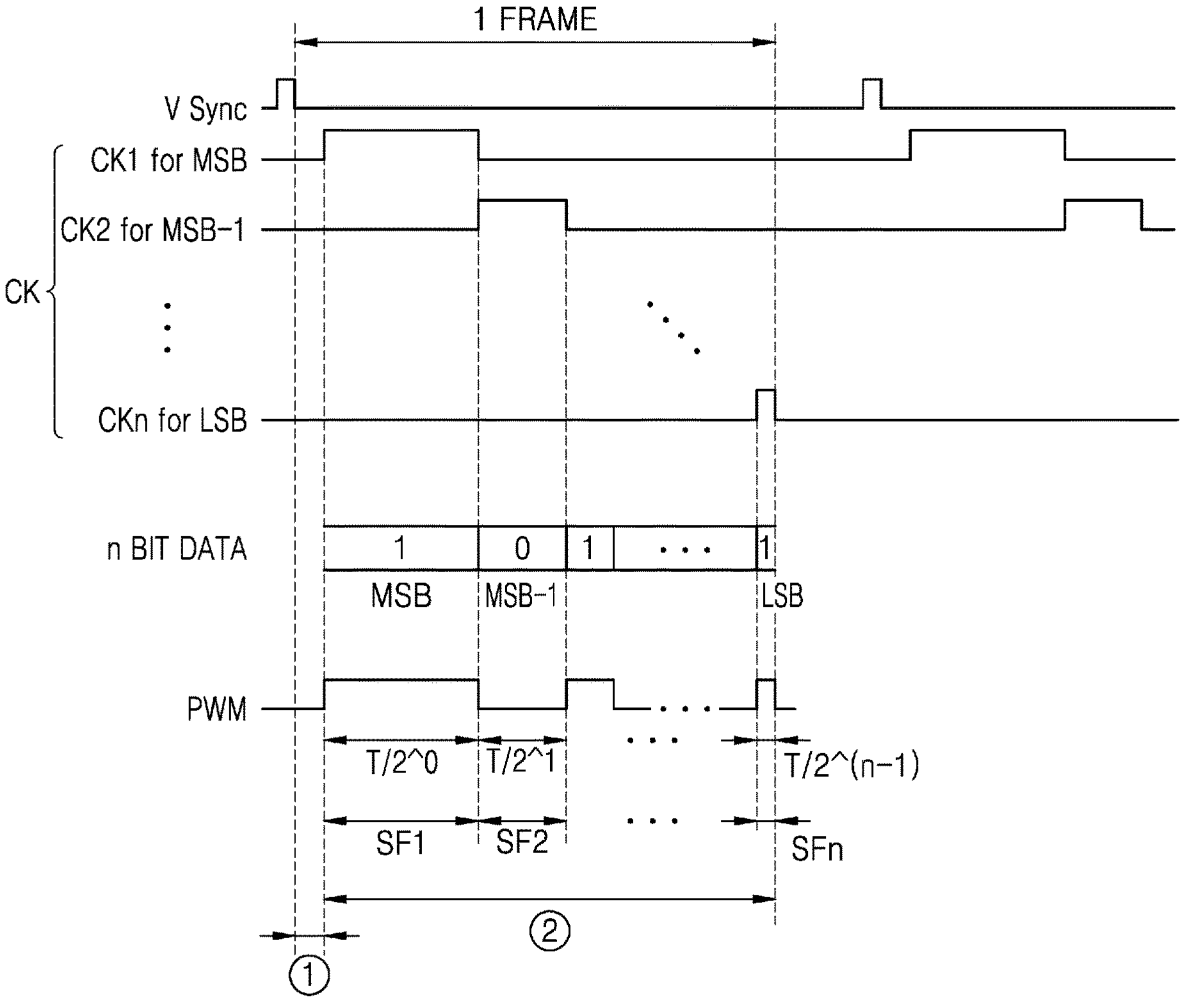
FIG. 7 is a diagram for describing driving of a pixel according to an embodiment of the present disclosure.

FIG. 7 is a diagram for explaining driving of a pixel according to an embodiment of the present disclosure.

FIG. 7 illustrates an example of driving a pixel in a first row. Referring to FIG. 7, the pixel PX may be driven in a data-writing period ① and a light-emitting period ② during a single frame. The light-emitting period ② may be driven by dividing into a first subframe SF1 to an n-th subframe SFn.

In the data-writing period ①, the bit value of the image data DATA from the data driving unit 125 may be recorded in the memory 503 in the pixel PX.

In each subframe of light-emitting period ②, a clock signal CK is applied to the PWM controller 501, and the PWM controller 501 may generate a PWM signal based on the bit value and clock signal CK of the image data DATA recorded in memory 503.

The lengths of time allocated to the first subframe SF1 to the n-th subframe SFn may be different from one another. For example, a first length T/2^0 may be allocated to the first subframe SF1, a second length T/2^1 may be allocated to a second subframe SF2, and a third length T/2^2 may be allocated to a third subframe SF3, and an n-th length T/2^(n−1) may be allocated to the n-th subframe SFn.

The image data DATA may be represented by n bits including the most significant bit MSB and the least significant bit LSB. The order from the most significant bit MSB to the least significant bit LSB may correspond to the order from the first subframe SF1 to the n-th subframe SFn.

The clock signal CK includes a first clock signal CK1 to an n-th clock signal CKn, and the first clock signal CK1 to the n-th clock signal CKn may be sequentially output in order corresponding to the order of first subframe SF1 to n-th subframe SFn.

The length of clock signal CK may vary depending on a subframe. For example, the first clock signal CK1 corresponding to the first subframe SF1 allocated to the most significant bit MSB of the image data DATA may have the first length T/2^0, a second clock signal CK2 corresponding to the second subframe SF2 allocated to a next higher bit MSB-1 of the image data DATA may have the second length T/2^1, and the n-th clock signal CKn corresponding to an n-th subframe SFTn allocated to the least significant bit LSB of the image data DATA may have n-th length T/2^(n−1).

For each of the first subframe SF1 to the n-th subframe SFn, the PWM controller 501 reads the corresponding bit value of the image data DATA from the memory 503, and may control the pulse width of the PWM signal based on the signal width of the clock signal CK and the bit value of the image data DATA.

The PWM controller 501 may generate the PWM signal (PWM) based on the clock signal CK output from the first subframe SF1 to the n-th subframe SFn and the bit value of the image data DATA.

In FIG. 7, an embodiment in which the image data DATA has n bit values of 101 . . . 1 is illustrated. The PWM controller 501 may output a pulse having a pulse width of first length T based on a bit value 1 of MSB of the image data DATA and the first clock signal CK1. The PWM controller 501 may turn off the pulse output for a second length T/2 based on a bit value 0 of MSB-1 of the image data DATA and the second clock signal CK2. The PWM controller 501 may output a pulse having a pulse width of n-th length T/2^(n−1) based on the bit value 1 of the LSB of the image data DATA and the n-th clock signal CKn.

The luminous element ED may emit light or may not emit light during a single frame according to the pulse output of the PWM signal. The luminous element ED may emit light for a time corresponding to the pulse width when the pulse output is turned on. The luminous element ED may not emit light as long as the pulse output is turned off.

Figure 8:
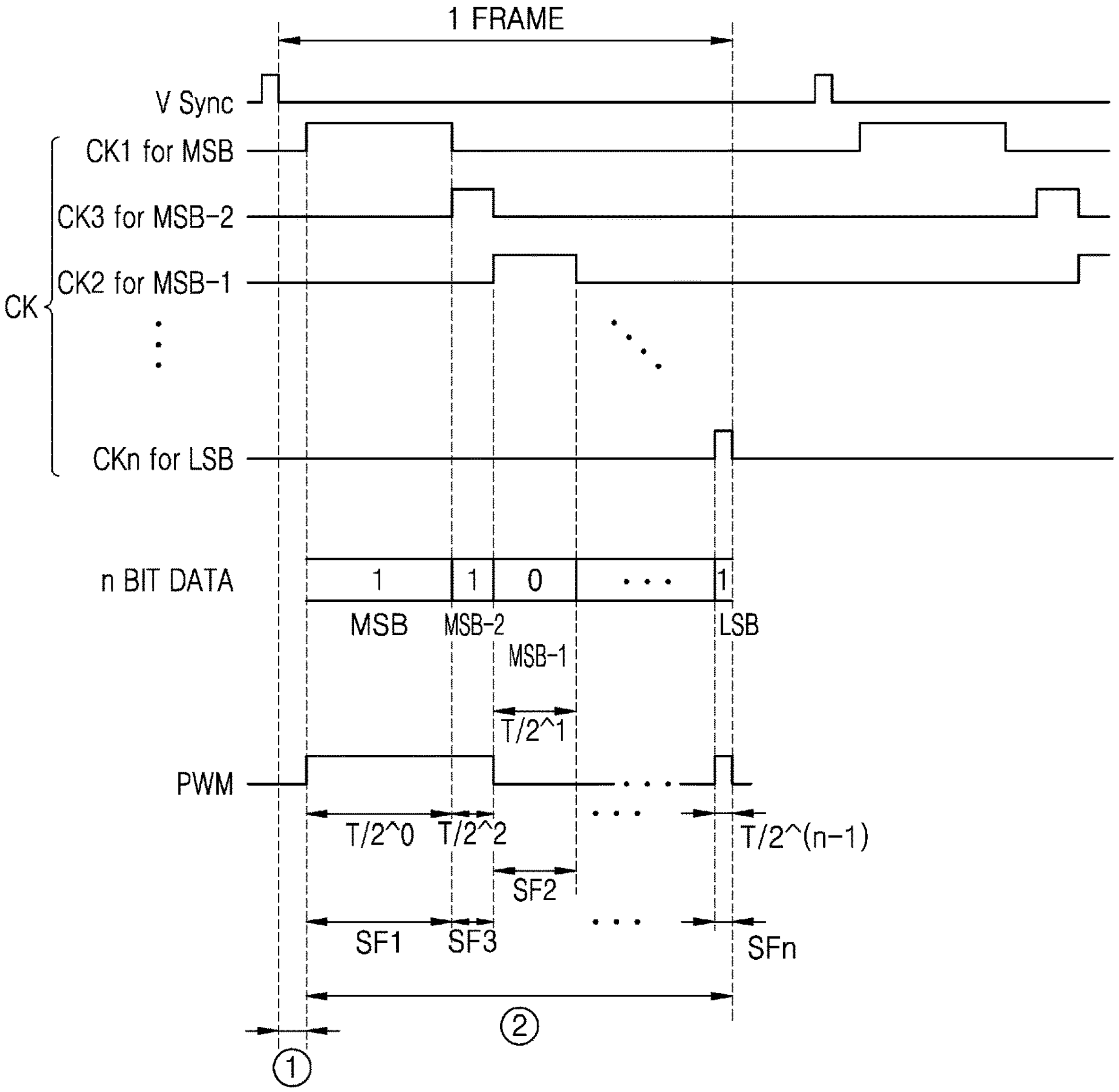
FIG. 8 is a diagram for explaining driving of a pixel according to another embodiment of the present disclosure.

FIG. 8 is a diagram for explaining driving of a pixel according to another embodiment of the present disclosure.

FIG. 8 is an example of driving a pixel in a first row. Referring to FIG. 8, the pixel PX may be driven in a data-writing period ① and a light-emitting period ② during a single frame. The light-emitting period ② may be driven by dividing into the first subframe SF1 to n-th subframe SFn. At this time, the order of expression of first subframe SF1 to n-th subframe SFn may be different from the embodiment of FIG. 7. FIG. 8 is an embodiment in which the third subframe SF3 is expressed earlier than the second subframe SF2. The clock signal CK and the bit order of image data DATA may also be determined corresponding to the expression order of the subframe. The order of expression of the subframe may be preset or changed.

Figure 9:
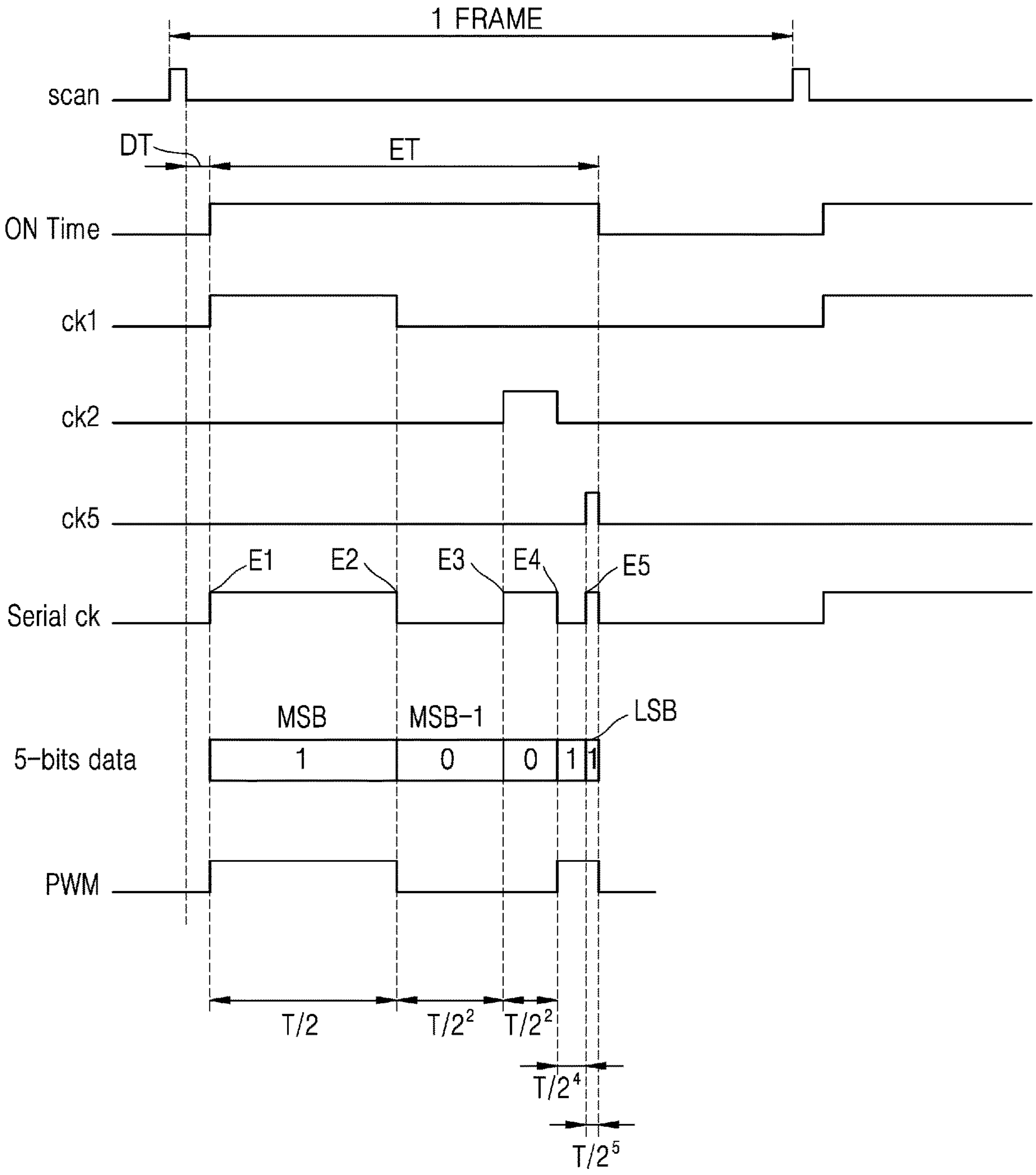
FIG. 9 is a diagram for explaining driving of a pixel with a serial clock signal according to an embodiment of the present disclosure.

FIG. 9 is a diagram for explaining driving of a pixel with a serial clock signal according to an embodiment of the present disclosure.

As mentioned above, the display device 30 according to an embodiment may convert n parallel clock signals into a serial clock signal through the parallel to serial converter.

The parallel to serial converter may be an element which is composed of a logic circuit including an OR gate. That is, when any one of a plurality of parallel clock signals input to the parallel to serial converter has high level, the parallel to serial converter may output a serial clock signal having a high level in a corresponding time period.

The serial clock signal may include information of edges (rising edges and/or falling edges) included in each of the plurality of parallel clock signals.

FIG. 9 shows an example in which a PWM signal is generated by 5-bit data (odd number) per frame.

Referring to FIG. 9, during the light emitting period of the single frame, a plurality of clock signals CK1, CK3, and CK5 may be generated by the clock generator 129 in synchronization with 5-bit data and may be converted into a serial clock signal Serial CK by the parallel to serial converter. The clock generator 129 according to an embodiment of the present disclosure may generate only clock signals corresponding to odd-numbered bits among bits included in the image data but is not limited thereto.

Each of the plurality of clock signals CK1, CK3, and CK5 may be applied at the same time as the time allocated to the most significant bit MSB, MSB-2, and LSB bits of 5-bit data.

The serial clock signal Serial CK may be applied to the PWM controller 501, and the PWM controller 501 may generate a PWM signal based on a bit value of 5-bit data written in the memory 503 and the serial clock signal Serial CK.

The PWM controller 501 may read the bit value of 5-bit data from the memory 503 and control the pulse width of the PWM signal based on the time interval between edges and the bit values of the bit data.

Specifically, the PWM controller 501 according to an embodiment of the present disclosure may distinguish bit values of 5-bit data based on the edge of the serial clock signal Serial CK. That is, reading a bit value (1) corresponding to the most significant bit MSB is performed based on the first edge E1, reading a bit value (0) corresponding to MSB-1 is performed based on the second edge E2, reading a bit value (0) corresponding to MSB-2 is performed based on the third edge E3, reading a bit value (1) corresponding to MSB-3 is performed based on the forth edge E4, and reading a bit value (1) corresponding to the least significant bit LSB is performed based on the fifth edge E5. In this case, the first edge E1, the third edge E3, and the fifth edge E5 may be rising edges, and the second edge E2 and the fourth edge E4 may be falling edges. According to the above-described embodiment, the PWM controller 501 may read the bit value of the odd-numbered bit of the bit data when a rising edge is input and read the bit value of the even-numbered bit of the bit data when a falling edge is input.

Figure 10:
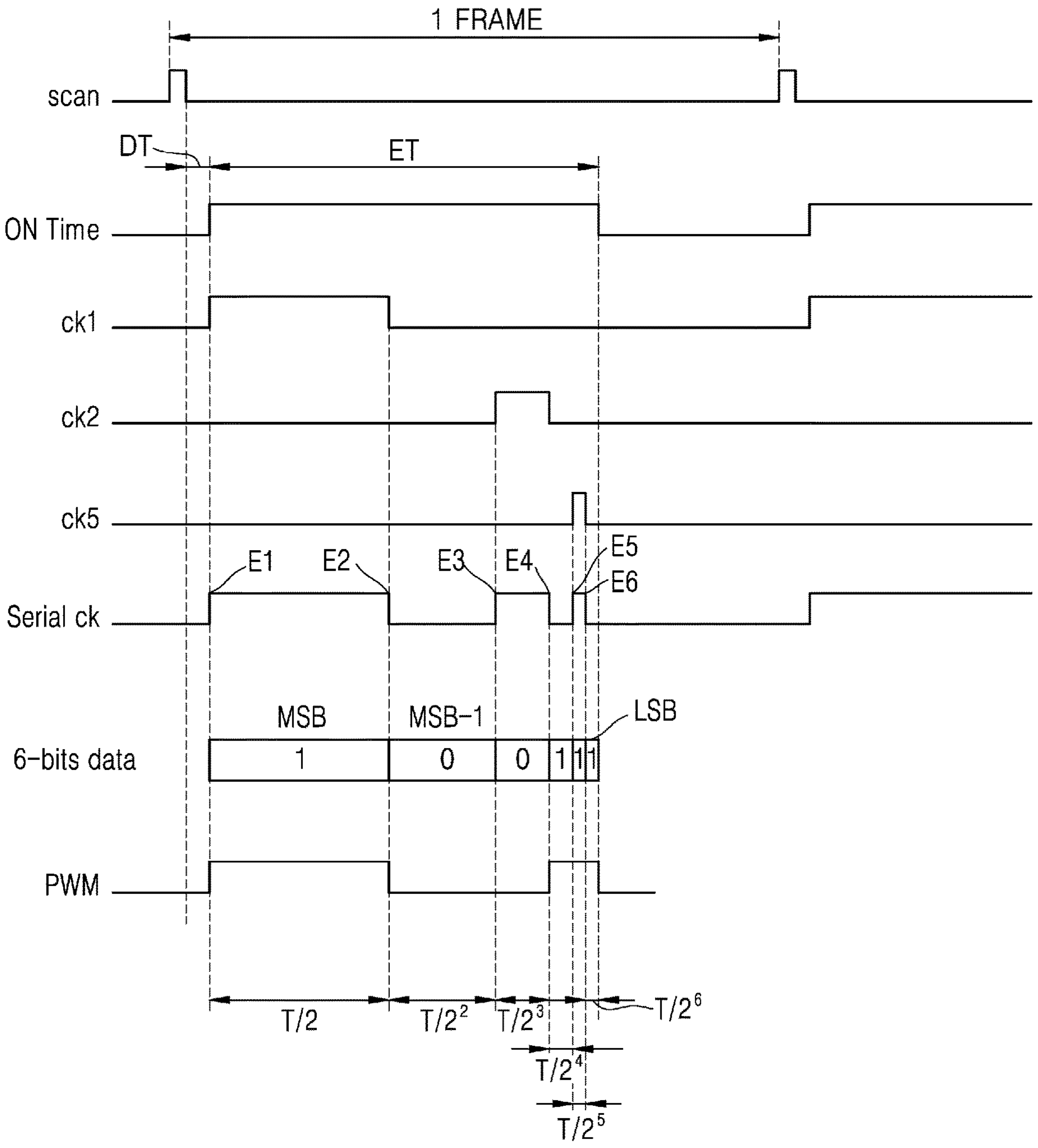
FIG. 10 is a diagram for explaining driving of a pixel with a serial clock signal according to another embodiment of the present disclosure.

FIG. 10 is a diagram for explaining driving of a pixel with a serial clock signal according to another embodiment of the present disclosure.

FIG. 10 shows an example in which a PWM signal is generated by 6-bit data (even number) per frame.

Referring to FIG. 10, similarly, during the light emission period of the single frame, a plurality of clock signals CK1, CK3, and CK5 may be generated by the clock generator 129 in synchronization with 6-bit data and may be converted into a serial clock signal Serial CK by the parallel to serial converter.

Each of the plurality of clock signals CK1, CK3, and CK5 may be applied at the same time as the time allocated to the most significant bit MSB, MSB-2, and MSB-4 bits of 6-bit data.

The serial clock signal Serial CK may be applied to the PWM controller 501, and the PWM controller 501 may generate a PWM signal based on a bit value of 6-bit data written in the memory 503 and the serial clock signal Serial CK. The PWM controller 501 may read the bit value of 6-bit data from the memory 503 and control the pulse width of the PWM signal based on the time interval between edges and the bit values of the bit data.

Specifically, the PWM controller 501 according to an embodiment of the present disclosure may distinguish bit values of 6-bit data based on the edge of the serial clock signal Serial CK. That is, reading a bit value (1) corresponding to the most significant bit MSB is performed based on the first edge E1, reading a bit value (0) corresponding to MSB-1 is performed based on the second edge E2, reading a bit value (0) corresponding to MSB-2 is performed based on the third edge E3, reading a bit value (1) corresponding to MSB-3 is performed based on the forth edge E4, and reading a bit value (1) corresponding to LSB+1 is performed based on the fifth edge E5. In this case, the first edge E1, the third edge E3, and the fifth edge E5 may be rising edges, and the second edge E2 and the fourth edge E4 may be falling edges.

On the other hand, since the bit value corresponding to the least significant bit LSB is read based on the sixth edge E6, the PWM controller 501 generates a PWM signal through ON Time to which a predetermined time is added to the serial clock Serial CK. In this case, the predetermined time may be at least a time exceeding T/2^6, which is the time allocated to the LSB.

FIG. 9 and FIG. 10 are provided as examples, and any suitable manner capable of generating a PWM signal based on a serial clock signal and controlling the pulse width of the PWM signal may be applied.

Figure 11:
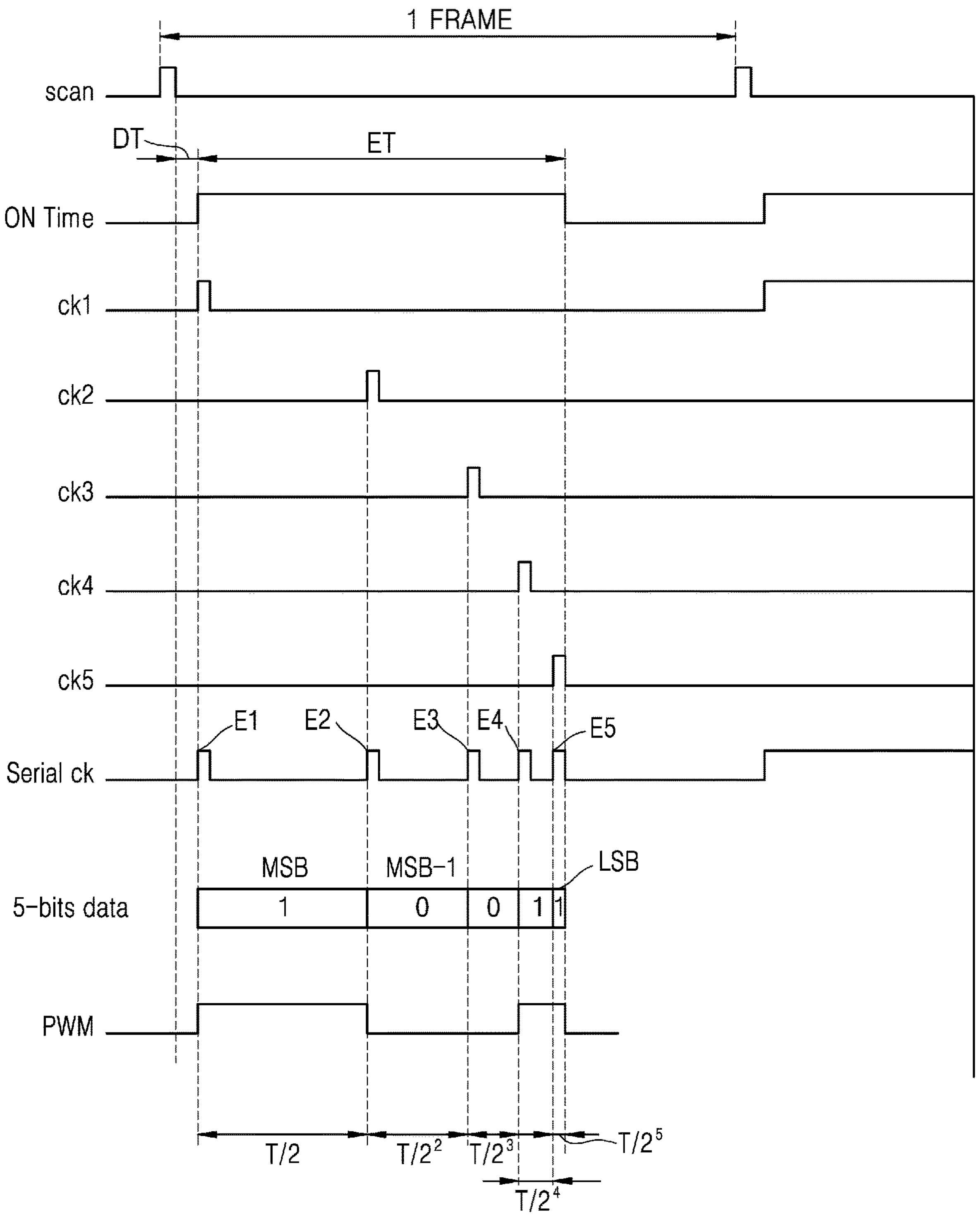
FIG. 11 is a diagram for explaining driving of a pixel with a serial clock according to another embodiment of the present disclosure.

FIG. 11 is a diagram for explaining driving of a pixel with a serial clock according to another embodiment of the present disclosure.

FIG. 11 may show an example in which a PWM controller set only rising edge as a reference for reading a bit value of bit data.

During the light emitting period of the single frame, a plurality of clock signals CK1 to CK5 may be generated by the clock generator 129 in synchronization with 5-bit data and may be converted into a serial clock signal Serial CK by the parallel to serial converter.

The PWM controller according to an embodiment of the present disclosure may read the bit value corresponding to the most significant bit MSB based on the first edge E1, the bit value corresponding to MSB-1 based on the second edge E2, the bit value corresponding to MSB-2 based on the third edge E3, the bit value corresponding to MSB-3 based on the forth edge E4, and the bit value corresponding LSB based on the fifth edge E5. At this time, all of the first edge E1 to the fifth edge E5 may be rising edges.

Meanwhile, in the present embodiment, since only the rising edge serves as a reference for reading a bit value, the signal width of the clock signal may be independent of PWM generation. Accordingly, the signal widths of the plurality of clock signals CK1 to CK5 may be freely generated unless they do not overlap between the clock signals.

For example, the clock signals CK1 to CK5 may be generated in the form of an impulse generating only a rising edge. Through this embodiment, power consumption generated on the clock line CL can be reduced.

Figure 12:
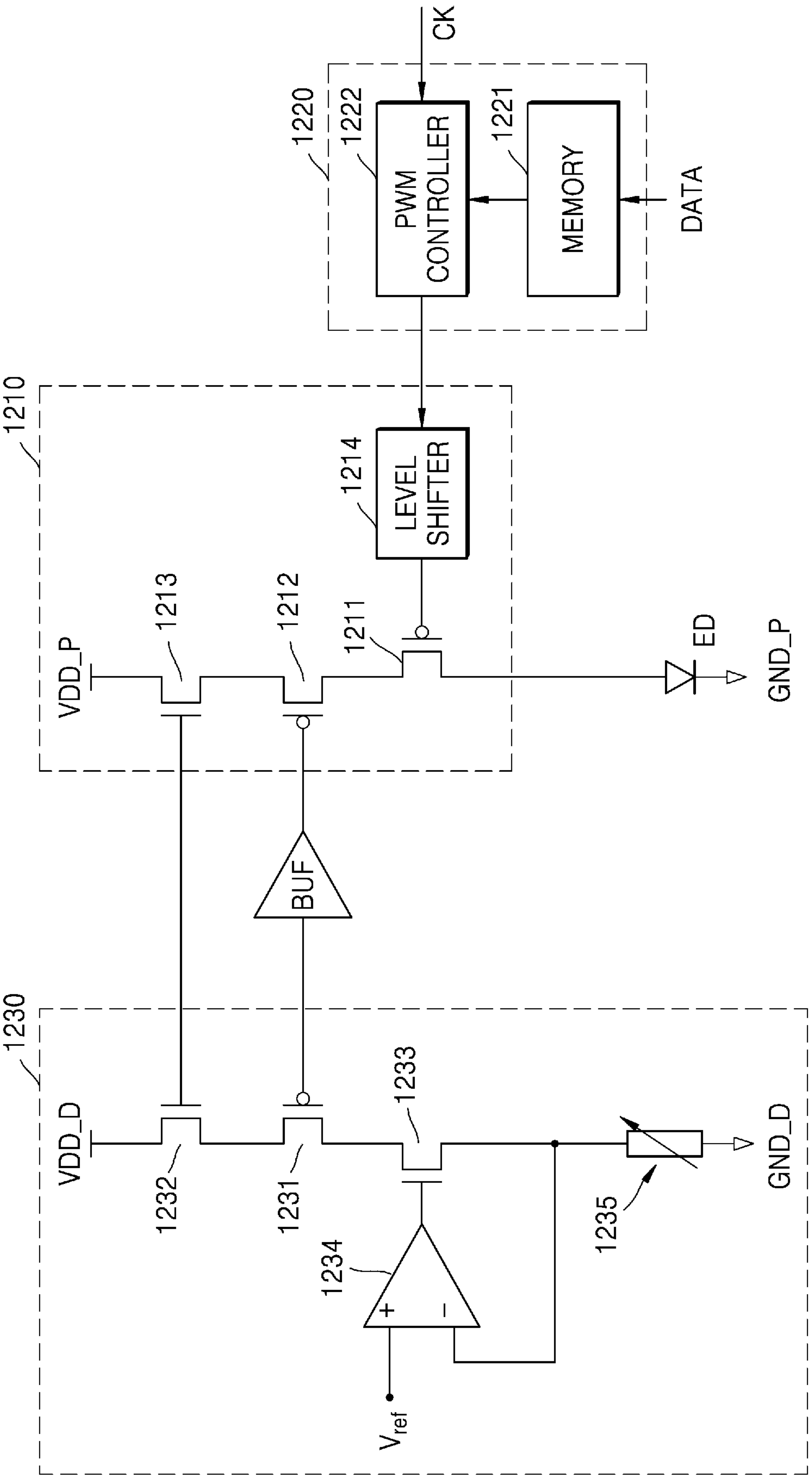
FIG. 12 is a circuit diagram illustrating a pixel PX driving apparatus according to an embodiment of the present disclosure.

FIG. 12 is a circuit diagram illustrating a pixel PX driving apparatus according to an embodiment of the present disclosure.

Referring to FIG. 12, the pixel PX driving apparatus may include a pixel circuit including a first pixel circuit 1210 connected to a luminous element ED (also referred as to an emitter) and a second pixel circuit 1220 and driving circuit 1230 connected to the pixel circuit. Although only one pixel circuit is illustrated in FIG. 12 for simplification of the drawing, a plurality of pixel circuits may be connected in parallel to a common power supply (e.g., driving circuit). The first pixel circuit 1210 may be a high voltage driving circuit and the second pixel circuit 1220 may be a low voltage driving circuit. The second pixel circuit 1220 may include a plurality of logic circuits.

The luminous element ED may selectively emit light for every subframe based on a bit value (logic level) of image data provided from the data driving unit 125 during a single frame, thereby adjusting the light-emission time within the single frame to display gradation.

The first pixel circuit 1210 may control light-emission and non-emission of the luminous element ED in response to the control signal applied to each of the plurality of subframes during a single frame. The control signal may be a pulse width modulation (PWM) signal.

The first pixel circuit 1210 may include a first transistor 1211, a second transistor 1212, a third transistor 1213, and a level shifter 1214. Hereinafter, an electrical connection connecting a pixel positive power VDD_P and a pixel negative power GND_P is referred to as a 'pixel line'.

The first transistor 1211 may be connected in series on the pixel line and may transmit or block a driving current to the luminous element ED in response to the control signal.

The first transistor 1211 may transmit or block the driving current to the luminous element ED in response to the PWM signal. A gate of the first transistor 1211 may be connected to an output terminal of the level shifter 1214, a first terminal of the first transistor 1211 may be connected to the second terminal of the second transistor 1212, and a second terminal of the first transistor 1211 may be connected to the luminous element ED.

The first transistor 1211 may be turned on or off according to the voltage output from the level shifter 1214. The light-emission time of the luminous element ED may be adjusted according to the turn-on or turn-off time of the first transistor 1211. The first transistor 1211 may be turned on when a gate-on-level signal is applied to the gate and transfers the driving current output from the second transistor 1212 to the luminous element ED, so that the luminous element ED may emit light. The first transistor 1211 may be turned off when a gate-off level signal is applied to the gate and blocks the driving current output from the second transistor 1212 to the luminous element ED, so that the luminous element ED may not emit light. During a single frame, the light-emission time and the non-emission time of the luminous element ED are controlled by the turn-on time and the turn-off time of the first transistor 1211, so that a color depth may be expressed.

The second transistor 1212 may output the driving current. A gate of the second transistor 1212 may be connected to the driving circuit 1230, the first terminal of the second transistor 1212 may be connected to the positive pixel power supply (VDD_P), and the second terminal of the second transistor 1212 may be connected to the first terminal of the first transistor 1211. The gate of the second transistor 1212 may be connected to a gate of a fourth transistor 1231, thereby forming a current mirror circuit together with the driving circuit 1230. Accordingly, as the fourth transistor of the driving circuit 1230 is turned on, the second transistor 1212 which has been turned on may supply a driving current corresponding to the current formed in the driving circuit 1230. The driving current may be equal to the current flowing in the driving circuit 1230.

The third transistor 1213 may be connected in series on the pixel line and may be connected to a source terminal of the second transistor 1212.

The level shifter 1214 may be connected to the second pixel circuit 1220. Specifically, the level shifter 1214 may be connected to an output terminal of the PWM controller 1222 of the second pixel circuit 1220. Since the detailed description of the level shifter 1214 has been described above with reference to FIG. 5, the detailed description thereof will not be provided again.

The second pixel circuit 1220 may store a bit value of image data applied from the data driving unit during a data writing period for every frame, and generate the PWM signal based on the bit value and a clock signal during the light-emitting period. The second pixel circuit 1220 may include a memory 1221 and the PWM controller.

Since detail descriptions of the memory 1221 and the PWM controller 1222 included in the second pixel circuit 1220 have been described above with reference to FIG. 5, the detail descriptions will be omitted.

The driving circuit 1230 may include the fourth transistor 1231, a fifth transistor 1232 and a current source, and the current source may include a sixth transistor 1233, an operational amplifier 1234 and a variable resistor 1235. Hereinafter, an electrical connection connecting between a driving positive power supply VDD_D and a driving negative power supply GND_D is referred to as a 'driving line'.

The current source may be connected in series on the driving line, applying a reference current. The reference current may be set to a current sufficient to cause the luminous element to emit light.

The fourth transistor 1231 may be configured to form a current mirror circuit with the second transistor 1212. The fourth transistor 1231 may be connected in series on the driving line and may be connected to the gate of the second transistor 1212.

The fifth transistor 1232 may be connected in series on the driving line, may be connected to a gate of the third transistor 1213, and may be connected to a source terminal of the fourth transistor 1231.

A drain terminal of the sixth transistor 1233 may be connected to a drain terminal of the fourth transistor 1231, a gate of the sixth transistor 1233 may be connected to an output terminal of the operational amplifier 1234, and a source terminal of the sixth transistor 1233 may be connected to a second input terminal (−) of the operational amplifier 1234.

A first input terminal (+) of the operational amplifier 1234 may be connected to a reference voltage $V_{ref}$ and the second input terminal (−) may be connected to the variable resistor 1235.

As illustrated in FIG. 12, the second transistor and the fourth transistor may be implemented as P-type MOSFETs, and the third transistor and the fifth transistor may be implemented as N-type MOSFETs. The gate of the fourth transistor and the drain terminal of the fourth transistor may be short-circuited.

The pixel PX driving apparatus according to the embodiment may further include buffer gate BUF connected between the gate of the second transistor and the fourth transistor.

In the pixel PX driving apparatus according to the embodiment, even when a voltage drop (IR drop) occurs due to a common impedance phenomenon due to the parallel connection of a plurality of pixels, the Vgs of the second transistor is not affected, thus the influence on the output current flowing in the pixel line can be minimized.

Figure 13:
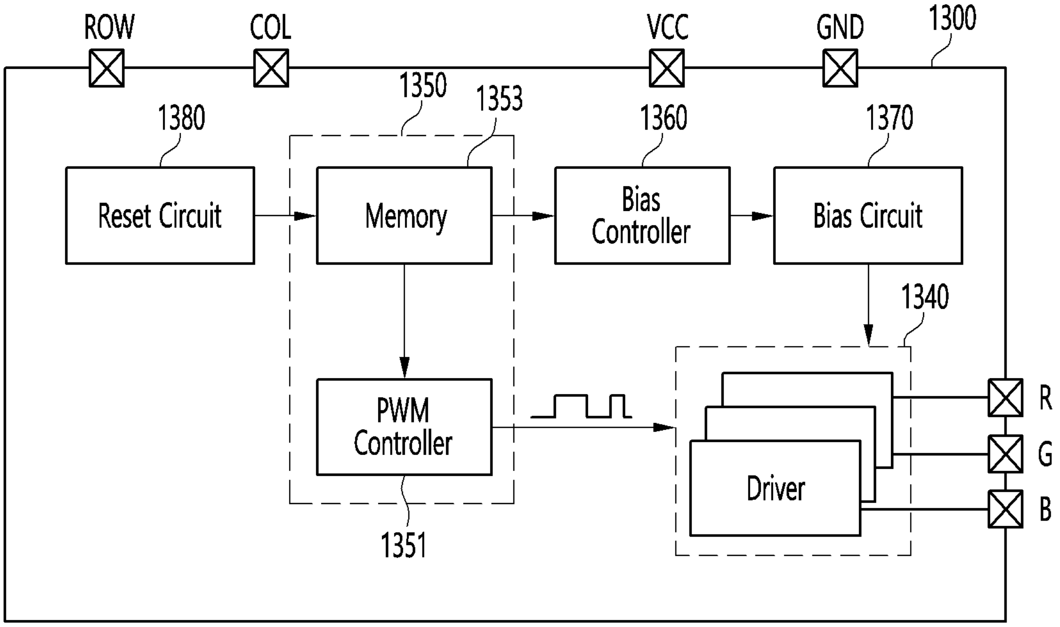
FIG. 13 is a circuit diagram illustrating a pixel circuit according to an embodiment of the present disclosure.

FIG. 13 is a circuit diagram illustrating a pixel circuit according to an embodiment of the present disclosure.

The pixel circuit 1300 may include bias circuit 1370. In the pixel circuit illustrated in FIG. 5, the driving current may be supplied corresponding to the current formed in the current supply unit 127 and the current supply unit 127 may be shared by a plurality of pixels PX, as illustrated in FIG. 6. However, the pixel circuit 1300 illustrated in the FIG. 13 may include bias circuit 1370 and a driving power (or, driving current) may be supplied by the bias circuit 1370. The bias circuit 1370 may be connected to a terminal VCC which is a pixel circuit receives power through.

The pixel circuit 1300 may include a first pixel circuit 1340 and the first pixel circuit 1340 may include one or more drivers which may be connected to luminous elements respectively. Each of the one or more drivers may correspond to the first pixel circuit 40 of FIG. 5. The bias circuit 1370 may supply the driving power to the first pixel circuit.

The pixel circuit 1300 may include a second pixel circuit 1350 and the second pixel circuit 1350 may include PWM controller 1351 and memory 1353. The second pixel circuit 1350 may correspond to the second pixel circuit 50 of FIG. 5.

The pixel circuit 1300 may include bias controller 1360. The bias controller 1360 may control the operation of the bias circuit 1370. Specifically, the bias controller 1360 may generate a bias control signal for controlling the bias circuit 1370 and output the bias control signal to the bias circuit 1370. The bias controller 1360 may control the operation of the bias circuit 1370 based on the data stored in the memory 1353. Specifically, the bias controller 1360 may control the operation of the bias circuit 1370 based on image data and bias control data stored in the memory 1353.

The pixel circuit 1300 may include reset circuit 1380. The reset circuit 1380 may control the reset of the memory 1353. Specifically, the reset circuit 1380 may generate a reset signal and output the reset signal to the memory 1353. The reset circuit 1380 may include one or more D flip-flops.

The memory 1353 may store bit values of image data and bit values of bias control data.

The bias control data may be related to charging of a capacitor (or, capacitors) in a driver and may be related to the operation of the bias circuit 1370. The bias controller 1360 may control the operation of the bias circuit 1370 based on the bias control data stored in the memory 1353, as described above.

In an embodiment, the number of times of the operation of the bias circuit 1370 in one cycle (that is, a single frame) or the number of times of charging of the capacitor within a single frame may be defined based on the bias control data.

For example, when the bias control data is <000>, the bias controller 1360 may output a bias control signal such that the bias circuit 1370 supplies the driving power continuously within one cycle. When the bias control data is <001>, the bias controller 1360 may output a bias control signal such that the bias circuit 1370 supplies the driving power only once within one cycle. When the bias control data is <010>, the bias controller 1360 may output a bias control signal such that the bias circuit 1370 supplies the driving power twice within one cycle. When the bias control data is <011>, the bias controller 1360 may output a bias control signal such that the bias circuit 1370 supplies the driving power three times within one cycle. That is, bit values of the bias control data stored in the memory 1353 are related to a number of times the bias circuit 1370 supplies the driving power during one cycle. The example is provided for better understanding and the number of bits and the bit values of the bias control data and the number of times of the operation of the bias circuit 1370 may be appropriately set in any manner.

In an embodiment, when the capacitor in the driver is charged with the driving power supplied by the bias circuit 1370, the bias controller 1360 may control the bias circuit 1370 stops supplying the driving power. When the capacitor is charged, the operation of the bias circuit 1370 may be restricted, thereby reducing power consumption.

In an embodiment, the bias controller 1360 may control the bias circuit 1370 such that the bias circuit 1370 stops supplying the driving power when the capacitor is charged with the driving power, and that the bias circuit 1370 supplies the driving power only when a bit value of image data is 1. In other words, in the present embodiment, the bias controller 1360 may read image data stored in the memory 1353, operate the bias circuit 1370 only in response to image data having a bit value of 1, and limit the operation of the bias circuit 1370 when the capacitor is charged with the driving power. In the present embodiment, the bias controller 1360 may not operate the bias circuit 1370 in response to image data having a bit value of 0. When a value of the image data is 0, there is no need to drive a luminous element, and accordingly, it is also not necessary to charge the capacitor. In the present embodiment, through the control of the operation of the bias circuit 1370, when the capacitor unit does not need to be charged, the driving power supply may be cut off, thereby reducing power consumption.

In an embodiment, the bias controller 1360 may control the bias circuit 1370 such that the bias circuit 1370 supplies the driving power only when a bit value of image data is 1, the bias circuit 1370 stops supplying the driving power when the capacitor is charged with the driving power, and the driving power is supplied K times within a single frame, wherein the number of times of charging is defined as K. That is, the bias controller 1360 may control the bias circuit 1370 such that if the number of bits having a bit value of 1 exceed K, the capacitor is charged in response to a portion of the bits having a bit value of 1 corresponding to K and the capacitor is not charged in response to the rest of the bits having a bit value. Preferably, the bias controller 1360 may operate the bias circuit 1370 in response to the bits having a bit value of 1 for the upper bit, and when the number of operations of the bias circuit 1370 reaches the number of times of charging within a single frame, then stop operating the bias circuit 1370 for the lower bit. In the present embodiment, power consumption may be reduced by the bias controller 1360 blocking the driving power supply to bits that exceed the number of times of charging.

Meanwhile, as described above, the bias controller 1360 may control the bias circuit 1370 such that the bias circuit 1370 stops supplying the driving power when the capacitor is charged with the driving power, and hereinafter, this operation will be referred to as "sampling operation". At this point, there may be the minimum time required to charge the capacitor, that is the minimum time the bias circuit 1370 must maintain operation.

Assuming that the driving speed of the display device (or pixel) increases, the length of time allocated to a single frame as well as the length of time allocated to each subframe constituting the single frame may be reduced. In addition, since the brightness expression in the PWM driving method is controlled by the signal width (on duty), the case of the display device that displays a low brightness image can also be understood in the same way.

Therefore, under the high-speed driving or low-brightness conditions, the length of time allocated to the subframe, especially, the subframe corresponding to lower bits, may be smaller than the minimum time required for the sampling operation, To overcome this phenomenon, in an embodiment, a method of omitting the sampling operation in a part of a single frame. That is, the bias controller 1360 may control the bias circuit 1370 omits the sampling operation for some subframes. The subframes the sampling operation is omitted may correspond to lower bits. The pixel circuit 1300 may include a register and the subframes the sampling operation is omitted may be set by setting data restored in the register. The size of the setting data may be appropriately set according to the size of the image data.

In an embodiment, for the subframes the sampling operation is omitted, the bias controller 1360 may control the bias circuit 1370 such that the bias circuit 1370 maintain the active state, that is "ON".

Figure 14:
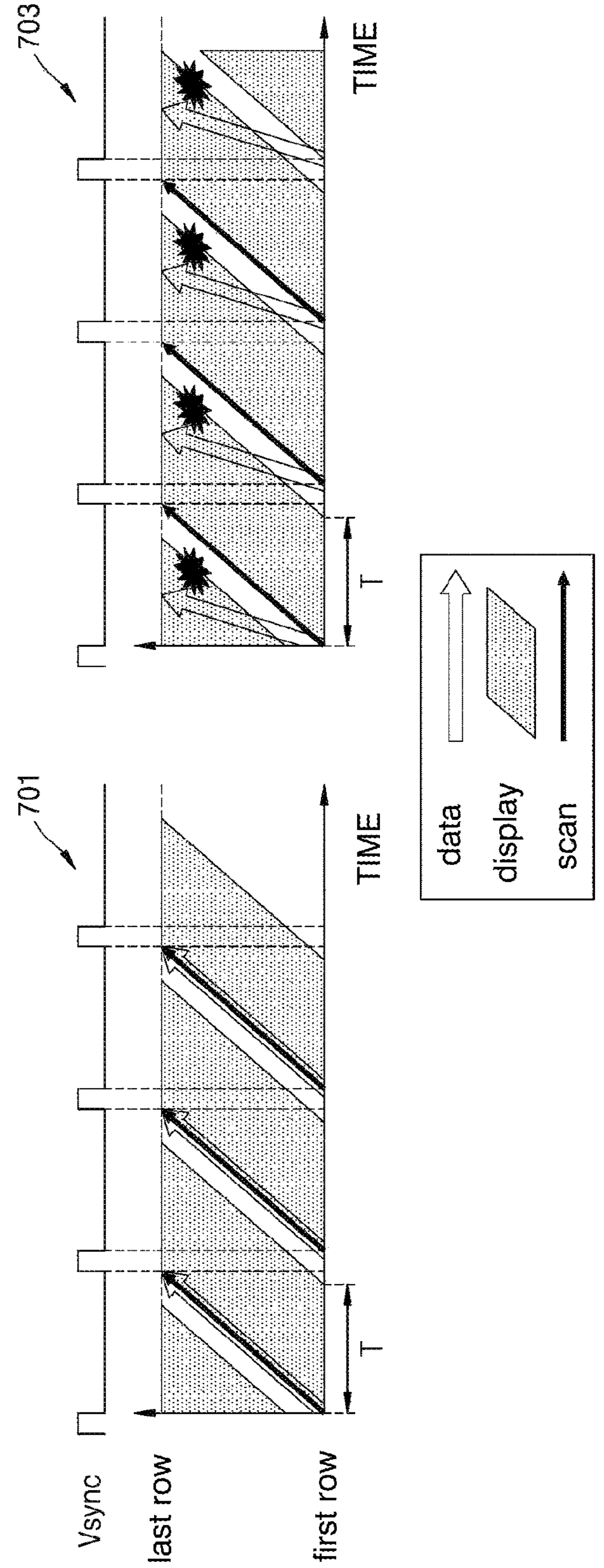
FIG. 14 is an example of a display operation in a mobile industry processor (MPIP) video mode and a command mode according to clock signal drive according to some embodiments.

FIG. 14 is an example of a display operation in a mobile industry processor (MPIP) video mode and a command mode according to clock signal drive according to some embodiments.

The left figure of FIG. 14 is an example of display operation in MPIP video mode according to an aspect of the embodiment. Referring to a FIG. 701 on the left side of FIG. 14, in the video mode, the difference between the writing speed at which image data is stored in the memory and the reading speed at which the image data stored in the memory is read may be ignored or may be not ignored. In an embodiment, the display device may store image data in the pixels PX from the bottom to the top and from the left to the right of the display device based on the vertical sync signal and the scan signal, when outputting, there is no difference between the data writing speed and the reading speed based on the scan signal, so image data can be output from the host in real time.

A FIG. 703 on the right side of FIG. 14 is an example of display operation in MPIP command mode. Referring to right figure of FIG. 14, in a command mode, a difference occurs between a writing speed at which image data is stored in the memory and a reading speed at which image data stored in the memory is read.

In one embodiment, when the display device may store and output image data to the pixels (PX) from the first row of the display device, from the left to the right, based on the vertical sync signal and the scan signal, a difference in the reading speed based on the data writing rate and the scan signal may not normally display the image data in the pixel (PX) of a specific area of the display device.

An aspect of the present invention may have a configuration for adjusting the clock signal driving timing from the LSB to the MSB direction, which will be described in FIG. 15.

Figure 16:
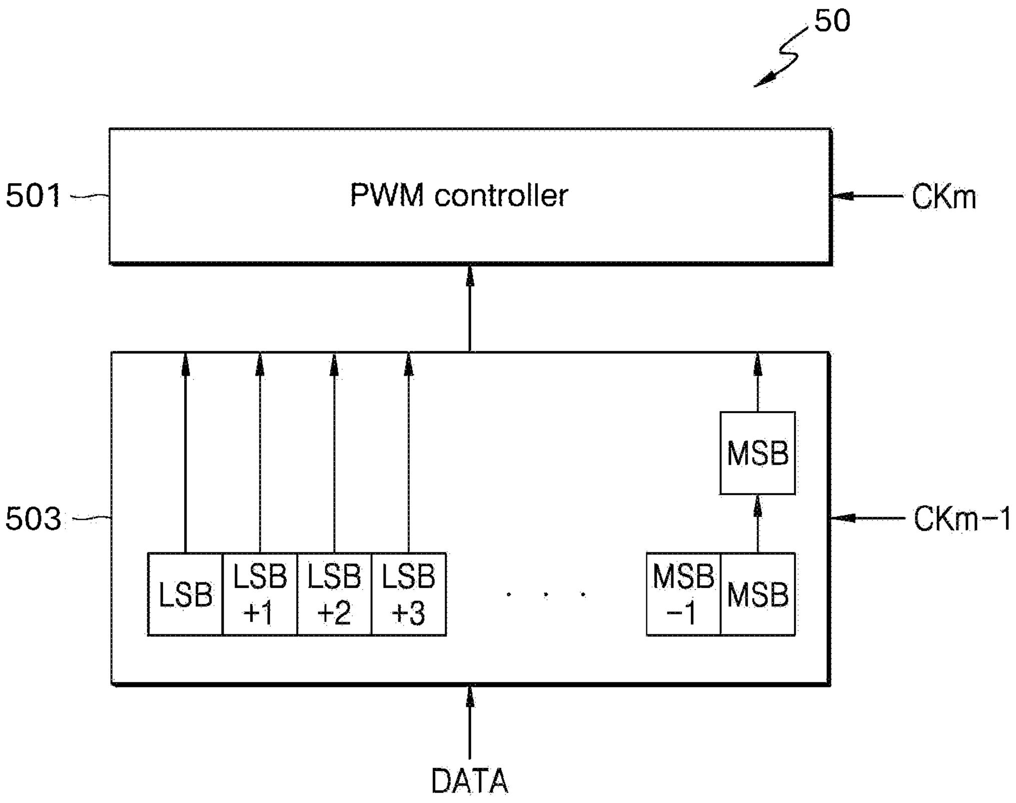
FIG. 16 is an example of an electronic device including additional memory in a memory inside pixel (MIP) circuit according to some embodiments.

An aspect of the present invention may have a configuration for additionally storing some of the bit values of the image data in the memory 503 in the pixel PX, the above configurations can solve an output failure that may cause a difference between the data writing speed and the reading speed based on the scan signal in the MIPI command mode in FIG. 16.

Figure 15:
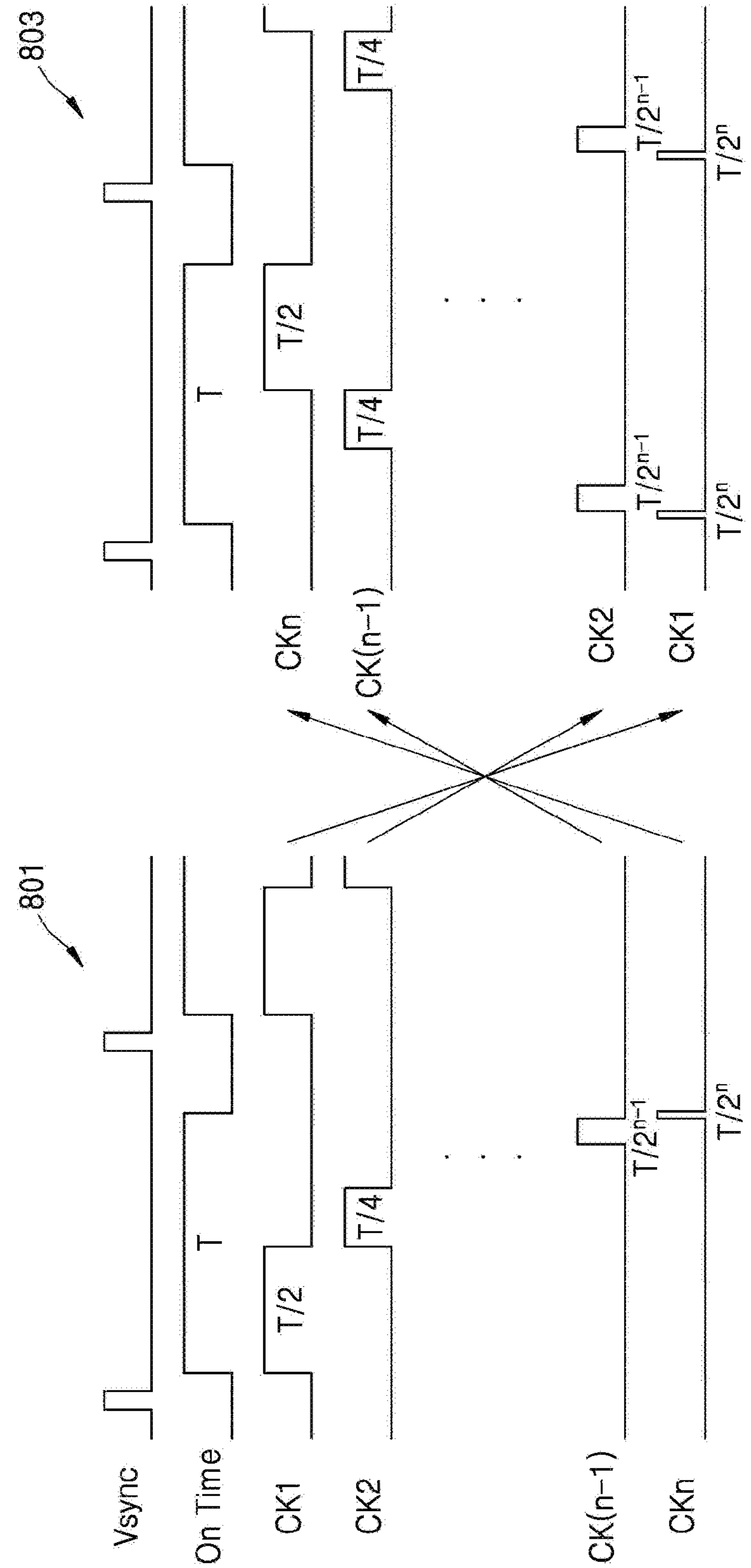
FIG. 15 is an example of an operation according to the clock signal drive timing change according to some embodiments.

FIG. 15 is an example of an operation according to the clock signal drive timing change according to some embodiments.

FIG. 15 illustrates an example of an operation according to a clock signal driving timing change according to aspects of the present invention. Referring to FIG. 15, the display device 30 may include a driving timing of a clock signal different from a driving timing of a general clock signal. A FIG. 801 on the left side of FIG. 15 shows a driving timing of the general clock signal of the display device 30 and a FIG. 803 on the right side of FIG. 15 shows the driving timing of the clock signal different from the general driving timing of the clock signal of the display device 30.

Referring to the right figure of FIG. 15, unlike a driving timing of the general clock signal, the pixel PX of the display device 30 may adjust the driving timing of the clock signal from "the MSB to the LSB" to "the LSB to the MSB" to minimize the number of affected bit values, thereby preventing a situation in which a plurality of bit values is affected.

For example, the emission period T of the display device 30 having a driving timing of a clock signal different from a driving timing of a typical clock signal is divided into the first subframe SF1 to the nth subframe SFn. The length of time allocated to each of the first subframe SF1 to the nth subframe SFn may be different.

For example, a first length T/2n is allocated to the first subframe SF1, a second length T/2^(n−1) is allocated to the second subframe SF2, and a third subframe A third length T/2^(n−2) may be allocated to (SF3), and an nth length T/2 may be allocated to an n-th subframe SFn.

The image data DATA may be expressed by n bits including the least significant bit and the most significant bit, and may correspond to the order of the first subframe SF1 to the nth subframe SFn in the order of the least significant bit to the most significant bit.

The clock signal CK may include the first clock signal CK1 to the nth clock signal CKn, and the first clock signal CK1 to the nth clock signal CKn includes the first subframe SF1 to the nth clock signal CKn. They may be output in order corresponding to the order of the n subframes SFn.

The length of the clock signal CK may be different for each subframe. For example, the first clock signal CK1 corresponding to the first subframe SF1 allocated to the least significant bit LSB of the image data DATA has a first length T/2^n, and the image data (DATA), the second clock signal CK2 corresponding to the second subframe SF2 allocated to the lower-order bit LSB+1 of the DATA) has a second length T/2^(n−1), and the image data DATA The n-th clock signal CKn corresponding to the n-th subframe SFn allocated to the most significant bit MSB may have an n-th length T/2).

In each of the first subframes SF1 to nth subframes SFn, the PWM controller 501 may read the corresponding bit value of the image data DATA from the memory 503, control the pulse width of the PWM signal based on the signal width of the clock signal CK and the bit value of the image data DATA.

The PWM controller 501 may generate the PWM signal PWM based on the clock signal CK output to the first subframe SF1 to the nth subframe SFn and the bit values of the image data DATA.

For example, when the image data DATA has n bit values of 1 . . . 101, the PWM controller 501 may output a pulse having a pulse width of a first length T/2n based on a bit value 1 of the LSB of the image data DATA and the first clock signal CK1. The PWM controller 501 may turn off the pulse output for the second length T/2^(n−1) based on the bit value 0 of the LSB+1 of the image data DATA and the second clock signal CK2. The PWM controller 501 may output a pulse having a pulse width of an nth length T/2 based on the bit value 1 of the MSB of the image data DATA and the nth clock signal CKn.

The luminous element ED may emit light or may not emit light according to the pulse output of the PWM signal during one frame. When the pulse output is turned on, the luminous element ED may emit light for a predetermined time corresponding to the pulse width. The luminous element ED may not emit light as long as the pulse output is off.

Unlike the driving timing of the general clock signal, the display device 30 may drive to read the bit values of the image data in the order of the least significant bit to the most significant bit, so that the difference between the data writing speed and the reading speed of the memory is reduced as in the MIPI command mode. It is possible to prevent a case in which the bit value of data is incompletely read and an error occurs in displaying the image data on the display.

For example, if there is a difference between the data writing speed and the reading speed of the memory in the driving timing of the general clock signal, the data is read from the most significant bit to the least significant bit, so at least one lower bit including the LSB is included. Before the reading of the bit values to be read is completed, image data to be received thereafter may be received by the display device and stored in the memory, and a plurality of low-order bit values may not be read because the times allocated to the subframe corresponding to the high-order bits are longer than the times allocated to the subframe corresponding to the low-order bits.

Accordingly, by adjusting the driving timing of the clock signal to read the clock signal in the order of the least significant bit to the most significant bit, it is possible to reduce the number of bits that may be affected by the difference between the data write speed and the read speed.

For example, since the time allocated to the subframe corresponding to the MSB corresponds to the latter half of the light emission period T, only one MSB may be affected by the difference between the data writing speed and reading speed.

If the driving timing of the clock signal is adjusted to read from the least significant bit to the most significant bit, incomplete reading of data can be prevented by storing the reduced number of bits in advance through minimal hardware or storage space, and driving the existing clock signal since a minimum amount of hardware or storage space is used compared to timing, power consumption of the display device 30 may be reduced.

FIG. 16 is an example of an electronic device including additional memory in a memory inside pixel (MIP) circuit according to some embodiments.

Referring to FIG. 16, the second pixel circuit 50 may include a PWM controller 501 and a memory 503. The display device 30 may store the number of bits that may be affected by the difference between the data writing speed and the reading speed in advance using the memory 503 in the second pixel circuit 50 by controlling a timing of the clock signal to read the bit values of the image data in the order of the least significant bit to the most significant bit.

According to an embodiment of the present invention, in responds to a clock signal CK input from the clock generator 129, the memory 503 in the second pixel circuit 50 may additionally store some bit values of the bit values of the n-bit digital data supplied and stored from the data driving unit 125, the additionally stored bit values may be used for image display during at least one frame or more.

In one embodiment, the additionally stored bit value may be an MSB of n bit data. For example, during the data writing period, data of first n bits of data is stored in the memory 503, when the new second n-bit data is stored in the memory 503 while the PWM controller 501 receives the m-th clock signal and reads the first n-bit data, the bit value of the first n-bit data may be incompletely read.

In this case, it is possible to completely read all the bit values of the previously stored n-bit digital data by reading some bit values additionally stored among the first n-bit data.

The memory 503 may use the additionally stored bit values to continuously display images for a plurality of frames even when another clock signal is input from the clock generator 129 during the light emission period.

In an embodiment, the memory 503 may additionally store the MSB among the stored bit values of the n-bit digital data at a time point when the memory 503 receives the clock signal after the data writing period. For example, during the data writing period, data of the first n bits of data is stored in the memory 503, and the clock generator 129 transmits the m−1-th clock signal to the memory 503 and the PWM controller 501. When the memory 503 additionally stores the MSB of the first n-bit data, the PWM controller 501 may read the bit value of the first n-bit data.

Thereafter, due to the difference between the write speed and the read speed, when the new second n-bit data is stored in the memory 503 while the first n-bit data is read, the PWM controller 501 stores the additionally stored MSB, the PWM controller 501 may read all bit values of the first n-bit data based on the additionally stored MSB.

Thereafter, when the generator 129 transmits the mth clock signal to the memory 503 and the PWM controller 501, the memory 503 additionally may store the MSB of the second n-bit data, and the PWM controller 501 may send the second by reading the bit value of n bits of data, it is possible to completely read the bit values of data without failure.

According to various embodiments, the electronic device (e.g., the display device 30) may receive the first image data including bit values of one or more bits, and generate other clock signals, an allocated period corresponding to each of the one or more bits is mutually exclusive, in order from least significant bit (LSB) to most significant bit (MSB).

A controller configured to read each of the bit values of one or more bits from a first memory in response to each of the generated clock signals to determine control data, a first memory configured to store bit values of one or more bits of the first image data and a pixel circuit configured to control light emission of a pixel (PX) based on the control data.

According to various embodiments, the electronic device may further include a second memory configured to store the MSB when a clock signal other than a clock signal corresponding to the MSB of the first image data stored in the first memory is generated.

According to various embodiments, when the controller receives second image data including bit values of one or more bit, the second video corresponding to bit values of one or more bits of the first image data of the first memory and store and change bit values of one or more bits of data, and the second memory may be further configured to read the stored MSB from the second memory to determine the control data.

According to various embodiments, a clock signal other than the corresponding clock signal may be a clock signal corresponding to the higher order bit.

According to various embodiments, the allocated period may increase in an order of a least significant bit (LSB) to a most significant bit (MSB) of the corresponding one or more bits.

According to various embodiments, the increment of the increasing allocated period may be twice that of the lower bit.

According to various embodiments, the controller may be further configured to store the bit values of one or more bits in the first memory in the order of the LSB to the MSB.

According to various embodiments, the controller may receive image data from the host through a mobile industry processor interface (MIPI) command mode.

Electronic devices according to various embodiments of the present disclosure may be devices of various types. The electronic device may include, for example, a portable communication device (e.g., a smart phone), a computer device, a portable multimedia device, a portable medical device, a camera, a wearable device, or a home appliance device. The electronic device according to the embodiment is not limited to the above-described devices.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon. For example, according to an embodiment, the module may be implemented in the form of an application-specific integrated circuit (ASIC).

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

The steps of the method or algorithm described in the embodiments of the disclosure may be implemented in a hardware manner, and may also be implemented in a manner of executing, by a processor, software. A software instruction may consist of a corresponding software module, and the software module may be stored in a RAM, a flash memory, a Read Only Memory (ROM), an Erasable Programmable ROM (EPROM), an Electrically EPROM (EEPROM), a register, a hard disk, a mobile hard disk, a Compact Disc-ROM (CD-ROM) or a storage medium in any other form well known in the field. An exemplary storage medium is coupled to the processor, thereby enabling the processor to read information from the storage medium and write information into the storage medium. Of course, the storage medium may also be a component of the processor. The processor and the storage medium may be located in an ASIC. In addition, the ASIC may be located in an access network device, a target network device or a core network device. Of course, the processor and the storage medium may also exist in the access network device, the target network device or the core network device as discrete components.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the present specification, the present disclosure has been described through limited embodiments, but various embodiments are possible within the scope of the present disclosure. Also, although not explained, it will be said that an equal means is also directly coupled to the present disclosure. Therefore, the true scope of protection of the present disclosure should be determined by the following claims.

The invention claimed is:

1. A pixel comprising a luminous element and a pixel circuit connected to the luminous element, wherein the pixel circuit includes:

a first pixel circuit configured to control light-emission and non-emission of the luminous element in response to a control signal applied to each of a plurality of subframes constituting a single frame during a light-emitting period;

a second pixel circuit configured to store bit values of image data in a data writing period and generate the control signal based on the bit values and a clock signal;

a bias circuit configured to supply a driving power to the first pixel circuit; and a bias controller configured to generate a bias control signal for controlling the bias circuit and output the bias control signal to the bias circuit, wherein the second pixel circuit is further configured to store bit values of bias control data, and the bias controller is configured to generate the bias control signal based on the bias control data, wherein the bias control data defines a number of operations of the bias circuit in the single frame.

2. A pixel comprising a luminous element and a pixel circuit connected to the luminous element, wherein the pixel circuit includes:

a first pixel circuit configured to control light-emission and non-emission of the luminous element in response to a control signal applied to each of a plurality of subframes constituting a single frame during a light-emitting period;

a second pixel circuit configured to store bit values of image data in a data writing period and generate the control signal based on the bit values of image data and a clock signal;

a bias circuit configured to supply a driving power to the first pixel circuit; and a bias controller configured to generate a bias control signal for controlling the bias circuit and output the bias control signal to the bias circuit, wherein the first pixel circuit includes a driver, the driver includes a capacitor charged by the driving power, and the bias controller configured to control the bias circuit such that the bias circuit stops supplying the driving power when the capacitor is charged with the driving power.

3. A pixel comprising a luminous element and a pixel circuit connected to the luminous element, wherein the pixel circuit includes:

a first pixel circuit configured to control light-emission and non-emission of the luminous element in response to a control signal applied to each of a plurality of subframes constituting a single frame during a light-emitting period;

a second pixel circuit configured to store bit values of image data in a data writing period and generate the control signal based on the bit values and a clock signal;

a bias circuit configured to supply a driving power to the first pixel circuit; and a bias controller configured to generate a bias control signal for controlling the bias circuit and output the bias control signal to the bias circuit, wherein the first pixel circuit includes:

a first transistor configured to output a driving current; and a second transistor configured to transmit or block the driving current to the luminous element according to the control signal, wherein the second pixel circuit includes:

a memory configured to store the bit values of the image data; and a pulse width modulation (PWM) controller configured to read the bit values of the image data from the memory and determine a pulse width of the control signal for a subframe based on a length of the subframe and a bit value corresponding to the subframe.

* * * * *